US011240524B2

(12) United States Patent
Chen et al.

(10) Patent No.: US 11,240,524 B2
(45) Date of Patent: Feb. 1, 2022

(54) SELECTIVE SWITCH FOR PARALLEL PROCESSING

(71) Applicant: MediaTek Inc., Hsinchu (TW)

(72) Inventors: Chun-Chia Chen, Hsinchu (TW); Yu-Ling Hsiao, Hsinchu (TW); Chih-Wei Hsu, Hsinchu (TW); Tzu-Der Chuang, Hsinchu (TW); Ching-Yeh Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/105,569

(22) Filed: Nov. 26, 2020

(65) Prior Publication Data

US 2021/0160528 A1    May 27, 2021

Related U.S. Application Data

(60) Provisional application No. 62/940,961, filed on Nov. 27, 2019.

(51) Int. Cl.
*H04N 19/513* (2014.01)
*H04N 19/70* (2014.01)
(Continued)

(52) U.S. Cl.
CPC ......... *H04N 19/513* (2014.11); *H04N 19/176* (2014.11); *H04N 19/184* (2014.11); *H04N 19/70* (2014.11)

(58) Field of Classification Search
None
See application file for complete search history.

(56) References Cited

U.S. PATENT DOCUMENTS

2017/0099495 A1    4/2017 Rapaka et al.
2019/0246113 A1    8/2019 Xu et al.
(Continued)

FOREIGN PATENT DOCUMENTS

CN    109889850 A    6/2019
WO    2016048834 A1    3/2016

OTHER PUBLICATIONS

China National Intellectual Property Administration, International Search Report and Written Opinion for PCT/CN2020/132382, dated Feb. 26, 2021.
(Continued)

*Primary Examiner* — Christopher Braniff
(74) *Attorney, Agent, or Firm* — Oblon, McClelland, Maier & Neustadt, L.L.P.

(57) ABSTRACT

A video decoder determines whether the current block is coded by using intra block copy mode. The video decoder identifies a list of one or more prediction candidates for the current block. When the current block is not coded by using intra block copy mode, one or more spatial neighbors of the current block that are positioned in a same MER as the current block are excluded from the list of prediction candidates. When the current block is coded by using intra block copy mode and the list of prediction candidates belongs to a predefined subset of multiple different candidate lists, at least one of the identified prediction candidates is a spatial neighbor of the current block that is positioned in the MER. The video decoder reconstructs the current block by using a prediction candidate selected from the list of prediction candidates to generate a prediction of the current block.

16 Claims, 21 Drawing Sheets

(51) Int. Cl.
*H04N 19/184* (2014.01)
*H04N 19/176* (2014.01)

(56) References Cited

U.S. PATENT DOCUMENTS

2020/0120334 A1* 4/2020 Xu .................. H04N 19/573
2020/0195960 A1* 6/2020 Zhang ............... H04N 19/176
2020/0267406 A1* 8/2020 Chang ............... H04N 19/513

OTHER PUBLICATIONS

LG Electronics Inc., Non-CE8: Block vector predictor for IBC, Joint Video Experts Team (JVET) of ITU-T SG 16 WP 3 and ISO/IEC JTC 1/SC 29/WG 11, JVET-L0159r1, Macau, China, Oct. 8-12, 2018.

* cited by examiner

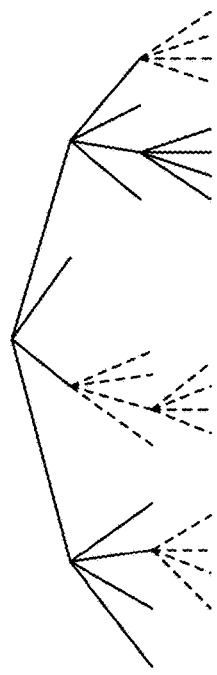
FIG. 1
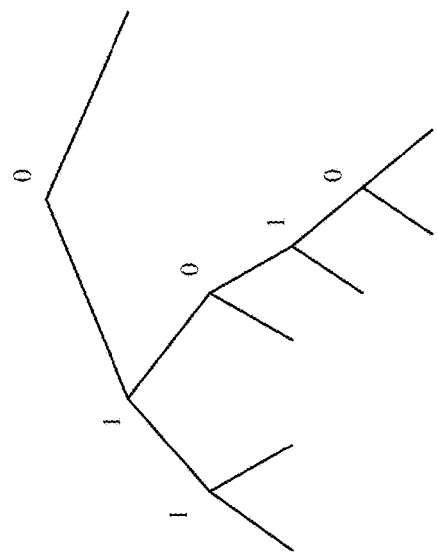
FIG. 2
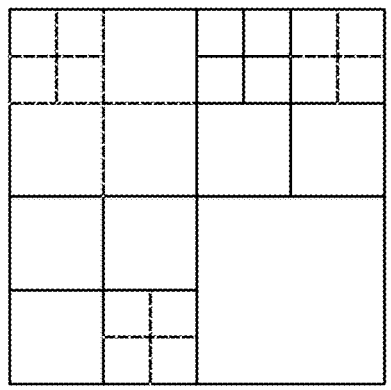
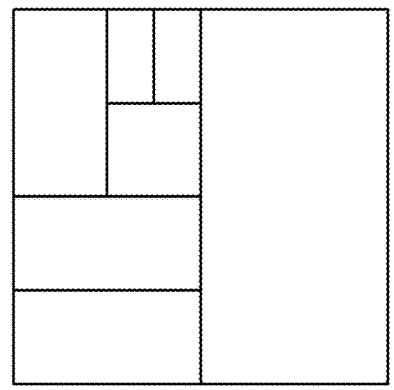

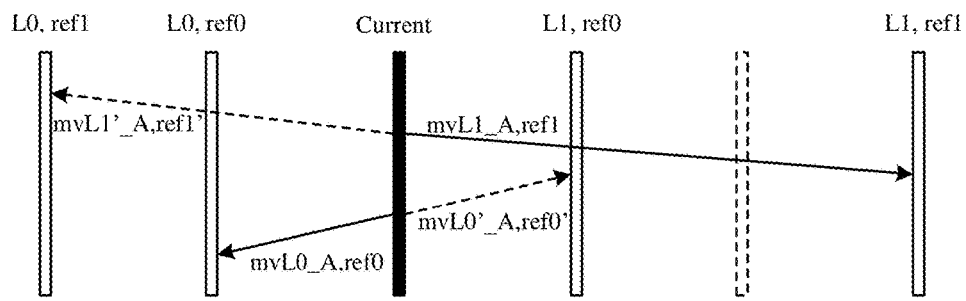
FIG. 8
FIG. 9

SELECTIVE SWITCH FOR PARALLEL PROCESSING

CROSS REFERENCE TO RELATED PATENT APPLICATION(S)

The present disclosure is part of a non-provisional application that claims the priority benefit of U.S. Provisional Patent Application No. 62/940,961, filed on 27 Nov. 2019. Content of above-listed application is herein incorporated by reference.

TECHNICAL FIELD

The present disclosure relates generally to video coding. In particular, the present disclosure relates to methods of facilitating parallel processing during video coding by merge mode.

BACKGROUND

Unless otherwise indicated herein, approaches described in this section are not prior art to the claims listed below and are not admitted as prior art by inclusion in this section.

High-efficiency video coding (HEVC) is a video coding standard developed by the Joint Collaborative Team on Video Coding (JCT-VC). In HEVC, a coded picture is partitioned into non-overlapped square block regions represented by the coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. An intra (I) slice is decoded using intra prediction only. A predictive (P) slice is decoded using intra prediction or inter prediction using at most one motion vector and a reference index to predict the sample values of each block.

One or more prediction units (PUs) are specified for each coding unit (CU). The prediction unit, together with the associated CU syntax, works as a basic unit for signaling the predictor information. The specified prediction process is applied to predict the values of the associated pixel samples inside the PU. A CU can be split into one, two, or four PUs, depending on the selected PU type. HEVC defines eight types of partitions for dividing a CU into PUs.

A CU can be further partitioned using the residual quadtree (RQT) structure for representing the associated prediction residual signal. The leaf nodes of the RQT correspond to the resulting transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and quantized coefficient values are coded in the bitstream. The minimum and maximum transform block sizes are specified in the sequence parameter set.

In the HEVC, the terms coding tree block (CTB), coding block (CB), prediction block (PB), and transform block (TB) are defined to refer to the 2-D sample array of one-color component from the associated CTU, CU, PU, and TU, respectively. A CTU thus consists of one luma CTB, two chroma CTBs, and associated syntax elements in a color picture not coded using three separate color planes. The signaled coding tree partitioning is generally applied to both luma blocks and chroma blocks, although some exceptions apply when certain minimum size constraints are encountered.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for identify prediction candidates based on Merge Estimation Region (MER) and Intra-Block Copy (IBC) modes. In some embodiments, a video decoder receives data from a bitstream to be decoded as a current block of a current picture of a video. The video decoder determines whether the current block is coded by using intra block copy mode. The video decoder identifies a list of one or more prediction candidates for the current block. When the current block is not coded by using intra block copy mode and the list of prediction candidates belongs to or is derived from a predefined subset of a plurality of different candidate lists, one or more spatial neighbors of the current block that are positioned in a same MER as the current block are excluded from the list of prediction candidates. When the current block is coded by using intra block copy mode, at least one of the identified prediction candidates is a spatial neighbor of the current block that is positioned in the MER. The video decoder reconstructs the current block by using a prediction candidate selected from the list of one or more prediction candidates to generate a prediction of the current block.

In some embodiments, when the current block is not coded by using intra block copy mode, the current block and at least one other block in the MER may be reconstructed in parallel. In some embodiments, one or more syntax elements in the bitstream indicates whether intra block copy mode is used for coding the current block, and the decoder parses one or more syntax elements in the bitstream and determining whether intra block copy mode is used for the current block based on the parsed syntax elements. In some embodiments, one or more syntax elements in the bitstream can be used to identify or define a MER that include the current block.

The prediction of the current block may be an affine prediction that is generated based on the selected prediction candidate. The prediction of the current block may be a triangular or geometric partition mode (GPM) prediction that is generated based on the selected prediction candidate. The prediction of the current block may be a combined inter and intra prediction (CIIP) that is generated based on the selected prediction candidate. The prediction of the current block may be generated by refining the selected prediction candidate with a motion vector difference information. The predefined subset of the plurality of different candidate lists may include candidates of merge-like prediction modes such as GPM, CIIP, and regular merge mode and exclude candidates of advanced motion vector prediction (AMVP).

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 1 illustrates splitting a coding tree unit (CTU) as a quadtree.

FIG. 2 shows an example of splitting process and its binary tree.

FIG. 8 illustrates a merge candidates list that includes scaled merge candidates.

FIG. 9 illustrates an example in which zero vector candidates are added to a merge candidates list or an Advanced Motion Vector prediction (AMVP) candidates list.

FIGS. 23 and 24 illustrates regions of a pixel block created by geometric partitioning.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Partitioning Structures

In HEVC, a picture consists of slices, and a slice consists of CTUs. A CTU is a square of size 8×8, 16×16, 32×32, and 64×64. One CTU is partitioned into several coding units (CU). A quadtree structure is used to partition the CTU. CTU size is M×M (M is one of the values of 64, 32, or 16). The CTU can be either a single CU or be split into 4 units of sizes of M/2×M/2, which are coding tree nodes. If units are leaf nodes, they become CUs. Otherwise, the quadtree can be further split until the size for a node reaches the minimum CU size specified in the SPS. FIG. 1 illustrates splitting CTU as a quadtree. The solid lines are CU boundaries. One or more PU (prediction units) exists in each CU.

Coupled with the CU, the PUs are basic blocks for sharing the prediction information. Inside each PU, the same prediction process is applied. A CU can be split into 1, 2, or 4 PUs according to the PU partitioning type. The PU may only be split once. Alternatively, the binary tree (BT) partitioning structure may be used. Specifically, a block can be split into 2 smaller blocks recursively. The symmetric horizontal and vertical splitting are the most efficient and simple splitting types. In some embodiments, only these two splitting types are used. The binary tree partitioning process can be split recursively until the width or height for a split block reaches the minimum block width or height that can be defined in high level syntax in the video bitstream.

FIG. 2 shows an example of splitting process (left) and its binary tree (right). In each splitting, non-leaf node of the binary tree, a flag denotes whether horizontal or vertical is used, 0 indicates horizontal splitting and 1 indicates vertical splitting. The binary tree splitting structure can be used for partitioning a CTU into CUs, i.e., the root node is a CTU and the leaf nodes are CUs. And for simplification, as another embodiment, there is no further partitioning from CU to PU. That means CU equal to PU, therefore, it equals that the leaf node of the binary tree is the basic unit for prediction.

Figure 3:
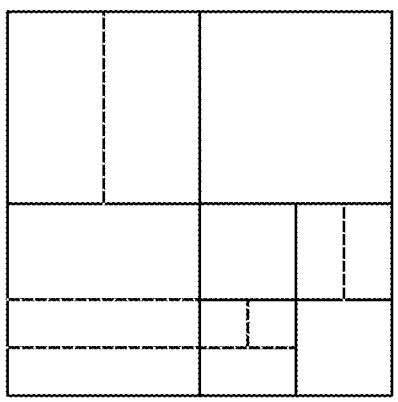
FIG. 3 shows an example of quad-tree-binary-tree (QTBT) structure.
Figure 3:
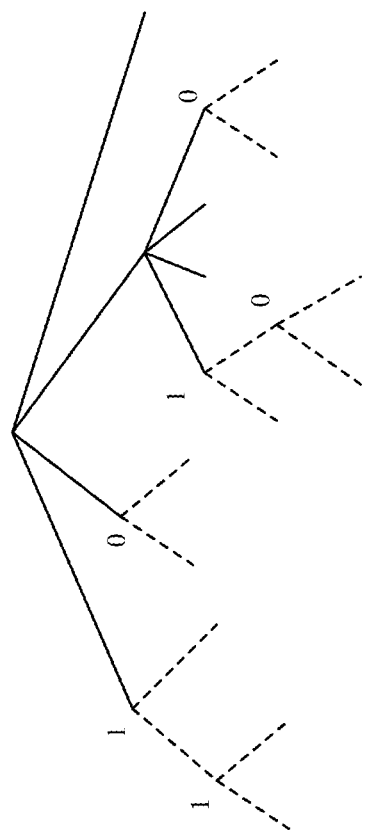

In some embodiments, a QTBT structure (quadtree plus binary tree structure) is used. It combines the quadtree and binary tree. In the QTBT structure, firstly, a block is partitioned by a quadtree splitting process, the quadtree (QT) splitting process can be iterated until the size reaches the minimum leaf node size. Secondly, if the leaf quadtree block is not larger than the maximum allowed binary tree root node size, the leaf quadtree block can be further split into binary tree (BT) partitioning, the binary splitting can be iterated until the width or height for the splitting block reaches the minimum allowed width or height or the binary splitting depth reaches the maximum allowed depth. FIG. 3 shows an example of QTBT structure. The QTBT structure can be used for partitioning a CTU into CUs, i.e., the root node is a CTU which is partitioned into multiple CUs by a QTBT structure, and the CUs are further processed by prediction and transform coding. And for simplification, as another embodiment, there is no further partitioning from CU to PU. That means CU equal to PU, therefore, it equals that the leaf node of the QTBT tree is the basic unit for prediction.

For I slices, the QTBT structure is applied separately to luma and chroma. For P and B slice, the QTBT structure is applied simultaneously to both luma and chroma (except when chroma reaches certain minimum sizes). In other words, in I slice, the QTBT-structured block partitioning trees differs between the luma CTB and the two chroma CTBs. Specifically, the luma CTB has QTBT-structured block partitioning, and the two chroma Coding Tree Unit (CTB) has another QTBT-structured block partitioning.

Flexible CU structure like Quad-Tree-Binary-Tree (QTBT) shows good coding performance compared to Quad-Tree (QT) structure in HEVC. In QTBT, as shown in FIG. 3 a CTU is firstly partitioned by a quad-tree structure. The quad-tree leaf nodes are further partitioned by a binary-tree structure. To recursively partition a block into two smaller blocks, besides the conventional symmetric horizontal and vertical splitting types, the asymmetric horizontal and vertical splitting types can also be selected. After constructing the binary tree structure, binary-tree leaf nodes are denoted as CUs, which are used for prediction and transform without any further partitioning.

To further support more partition shapes to achieve more flexible partitioning, triple tree (TT) partitioning method is designed to capture objects which locate in the block center while quad-tree (QT) and binary tree (BT) partitioning methods always split along the block center.

Multi-Type-Tree (MTT) block partitioning extends the concept of the two-level tree structure in QTBT by allowing both the binary tree and triple tree partitioning methods in the second level of MTT. The two levels of trees in MTT are called region tree (RT) and prediction tree (PT) respectively. The first level RT is always quad-tree (QT) partitioning, and the second level PT may be either binary tree (BT) partitioning or triple tree (TT) partitioning. For example, a CTU is firstly partitioned by RT, which is QT partitioning, and each RT leaf node may be further split by PT, which is either BT or TT partitioning. A block partitioned by PT may be further split with PT until a maximum PT depth is reached, for example, a block may be first partitioned by vertical BT partitioning to generate a left sub-block and a right sub-block, and the left sub-block is further split by horizontal TT partitioning while the right sub-block is further split by horizontal BT partitioning. A PT leaf node is the basic CU for prediction and transform and will not be further split.

Figure 4:
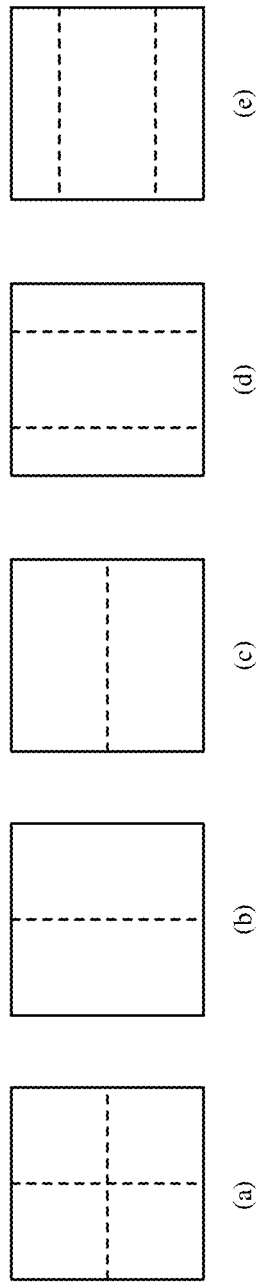
FIG. 4 illustrates several split types or modes for partitioning a CTU in a multi-type tree (MTT) structure.

FIG. 4 illustrates several split types or modes (a)-(e) for partitioning a CTU in an MTT structure. Split types (a) (b) and (c) correspond to quad-tree split, vertical binary tree split, and horizontal binary tree split, respectively. Split types (d) and (e) are referred to as triple-tree (or ternary tree) split types that divide a block into three smaller blocks. The three smaller blocks from the ternary-tree split have reduced sizes in one spatial dimension while keeping the same size in the other spatial dimension. The triple tree partitioning method may provide capability to faster localize small object along block boundaries, by allowing one-quarter partitioning vertically or horizontally.

Figure 5:
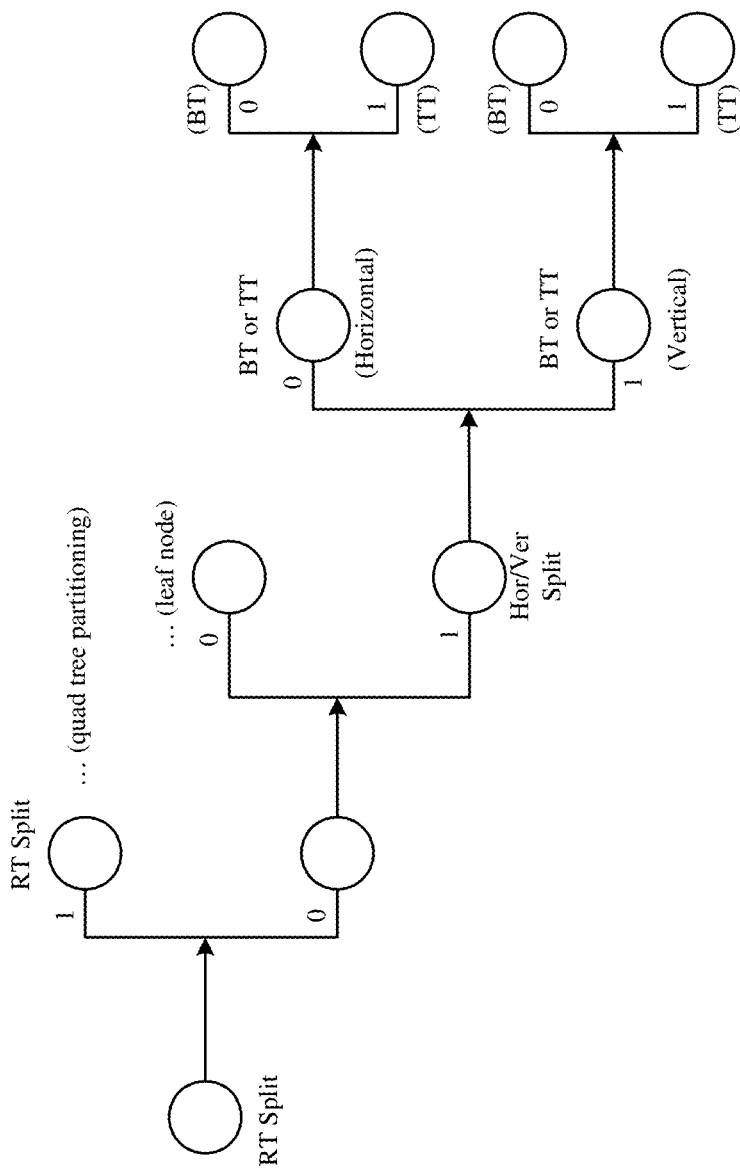
FIG. 5 illustrates an example of tree-type signaling for block partitioning according to MTT block partitioning.

FIG. 5 illustrates an example of tree-type signaling for block partitioning according to MTT block partitioning. RT signaling may be similar to the quad-tree signaling in QTBT block partitioning. For signaling a PT node, one additional bin is signaled to indicate whether it is a binary tree partitioning or triple tree partitioning. For a block split by RT, a first bin is signaled to indicate whether there is another RT split, if the block is not further split by RT (i.e. the first bin is 0), a second bin is signaled to indicate whether there is a PT split. If the block is not further split by PT (i.e. the second bin is 0), then this block is a leaf node. If the block is further split by PT (i.e. the second bin is 1), a third bin is sent to indicate horizontal or vertical partitioning followed by a fourth bin for distinguishing binary tree (BT) or triple tree (TT) partitioning.

After constructing the MTT block partition, MTT leaf nodes are CUs, which are used for prediction and transform without any further partitioning. In MTT, the tree structure is coded separately for luma and chroma in I slice, and is applied simultaneously to both luma and chroma (except when certain minimum sizes are reached for chroma) in P and B slice. That is to say that, in I slice, the luma CTB has its QTBT-structured block partitioning, and the two chroma CTBs has another QTBT-structured block partitioning.

II. Candidates for Inter-prediction Modes

To increase the coding efficiency of motion vector (MV) coding in HEVC, HEVC has the Skip, and Merge mode. Skip and Merge modes obtains the motion information from spatially neighboring blocks (spatial candidates) or a temporal co-located block (temporal candidate). When a PU is Skip or Merge mode, no motion information is coded, instead, only the index of the selected candidate is coded. For Skip mode, the residual signal is forced to be zero and not coded. In HEVC, if a particular block is encoded as Skip or Merge, a candidate index is signaled to indicate which candidate among the candidate set is used for merging. Each merged PU reuses the MV, prediction direction, and reference picture index of the selected candidate. For some embodiments, the term "merge mode" is used to refer to both skip mode and merge mode.

Figure 6:
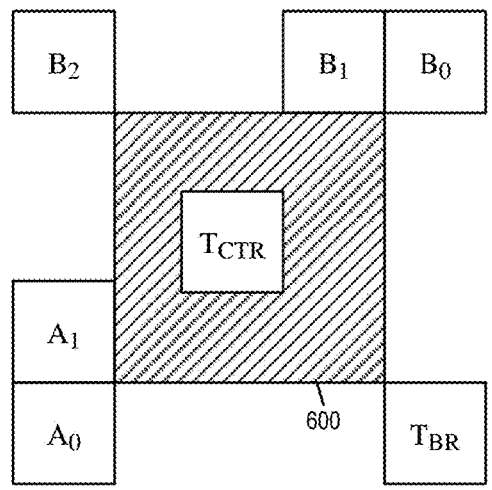
FIG. 6 shows the candidates set for inter-prediction modes.

FIG. 6 shows the candidates set for inter-prediction modes (i.e., skip, merge, AMVP, etc.). The figure shows a current block 600 of a video picture or frame being encoded or decoded. The current block 600 (which can be a PU or a CU) refers to neighboring blocks to derive the spatial and temporal MVPs as an MVP list or candidate list for AMVP mode, merge mode or skip mode.

For Merge mode, as shown in FIG. 6, up to four spatial MV candidates are derived from A0, A1, B0 and B1, and one temporal MV candidate is derived from TBR or TCTR (TBR is used first, if TBR is not available, TCTR is used instead). Note that if any of the four spatial MV candidates is not available, the position B2 is then used to derive MV candidate as a replacement. After the derivation process of the four spatial MV candidates and one temporal MV candidate, removing redundancy (pruning) is applied to remove redundant MV candidates. If after removing redundancy (pruning), the number of available MV candidates is smaller than five, three types of additional candidates are derived and are added to the candidate set (candidate list). The encoder selects one final candidate within the candidate set for Skip, or Merge modes based on the rate-distortion optimization (RDO) decision, and transmits the index to the decoder.

a. AMVP Mode

To achieve the best coding efficiency of hybrid coding architecture, HEVC employs intra-prediction and/or inter-prediction modes for each PU. For intra-prediction modes, the spatial neighboring reconstructed pixels can be used to generate the directional predictions in 35 directions. For inter-prediction modes, motion information is used to reconstruct temporal reference frames, which are used to generate motion compensated predictions. Motion information may include motion vectors, motion vector predictors, motion vector differences, reference indices for selecting reference frames, etc.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list are also encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

For AMVP mode, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. Therefore, after the derivation process of the two spatial MVPs and one temporal MVP, only the first two MVPs can be included in the candidate list. If after removing redundancy, the number of available MVPs is less than two, zero vector candidates are added to the candidates list.

For skip mode and merge mode, up to four spatial merge indices are derived from $A_0$, $A_1$, $B_0$ and $B_1$, and one temporal merge index is derived from $T_{BR}$ or $T_{CTR}$ ($T_{BR}$ is used first, if $T_{BR}$ is not available, $T_{CTR}$ is used instead). If any of the four spatial merge index is not available, the position $B_2$ is used to derive merge index as a replacement. After the deriving four spatial merge indices and one temporal merge index, redundant merge indices are removed. If the number of non-redundant merge indices is less than five, additional candidates may be derived from original candidates and added to the candidates list. There are three types of derived candidates:

1. Combined bi-predictive merge candidate (derived candidate type 1)
2. Scaled bi-predictive merge candidate (derived candidate type 2)
3. Zero vector merge/AMVP candidate (derived candidate type 3)

Figure 7:
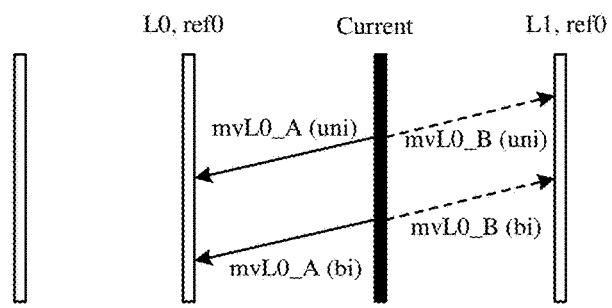
FIG. 7 illustrates a merge candidates list that includes combined bi-predictive merge candidates.

For derived candidate type 1, combined bi-predictive merge candidates are created by combining original merge candidates. Specifically, if the current slice is a B slice, a further merge candidate can be generated by combining candidates from List 0 and List 1. FIG. 7 illustrates a merge candidates list that includes combined bi-predictive merge candidates. As illustrated, two original candidates having mvL0 (the motion vector in list 0) and refIdxL0 (the reference picture index in list 0) or mvL1 (the motion vector in list 1) and refIdxL1 (the reference picture index in list 1), are used to create bi-predictive Merge candidates.

For derived candidate type 2, scaled merge candidates are created by scaling original merge candidates. FIG. 8 illustrates a merge candidates list that includes scaled merge candidates. As illustrated, an original merge candidate has mvLX (the motion vector in list X, X can be 0 or 1) and refIdxLX (the reference picture index in list X, X can be 0 or 1). For example, an original candidate A is a list 0 uni-predicted MV with mvL0_A and reference picture index ref0. Candidate A is initially copied to list L1 as having reference picture index ref0'. The scaled MV mvL0'_A is calculated by scaling mvL0_A based on ref0 and ref0'. A scaled bi-predictive Merge candidate having mvL0_A and ref0 in list L0 and mvL0'_A and ref0' in list L1 is created and added to the merge candidates list. Likewise, a scaled bi-predictive merge candidate which has mvL1 '_A and ref1' in List 0 and mvL1_A, ref1 in List 1 is created and added to the merge candidates list.

For derived candidate type 3, zero vector candidates are created by combining zero vectors and reference indices. If a created zero vector candidate is not a duplicate, it is added to the merge/AMVP candidates list. FIG. 9 illustrates an example in which zero vector candidates are added to a merge candidates list or an AMVP candidates list.

b. Sub-PU Temporal Motion Vector Prediction (ATMVP)

The ATMVP (Advanced Temporal Motion Vector Prediction) mode (or also called as Sub-PU Temporal Motion Vector Prediction (SbTMVP)) is a Sub-PU based mode for merge candidate. ATMVP mode uses a spatial neighbor to obtain an initial vector that is used to obtain the coordinate of the collocated block on the collocated picture. The sub-CU (usually 4×4 or 8×8) motion information of the collocated block on the collocated picture are retrieved and filled into sub-CU (usually 4×4 or 8×8) motion buffer of current merge candidate. There are several implementations of ATMVP. ATMVP is described in: Joint Video Exploration Team (JVET) of ITU-T SG 16 WP 3 and ISO/IEC JTC 1/SC 29/WG 11: 3rd Meeting: Geneva, CH, 26 May-1 Jun. 2016, Title: "*Algorithm Description of Joint Exploration Test Model 3*". ATMVP is also described in: Joint Video Experts Team (JVET) of ITU-T SG 16 WP 3 and ISO/IEC JTC 1/SC 29/WG 11 11th Meeting: Ljubljana, SI, 10-18 Jul. 2018, JVET-K0346-v3, Title: "*CE4-related: One simplified design of advanced temporal motion vector prediction (ATMVP)*".

c. Spatial-Temporal Motion Vector Prediction (STMVP)

The STMVP mode is a Sub-PU based mode for merge candidate. The motion vectors of the sub-PUs are generated recursively in raster scan order. The derivation of MV for current sub-PU identifies two spatial neighbors and one temporal neighbor before MV scaling. After retrieving and scaling the MVs, all available motion vectors (up to 3) are averaged and is assigned as the motion vector of the current sub-PU. STMVP is described in: Joint Video Exploration Team (JVET) of ITU-T SG 16 WP 3 and ISO/IEC JTC 1/SC 29/WG 11: 3rd Meeting: Geneva, CH, 26 May-1 Jun. 2016, Title: "*Algorithm Description of Joint Exploration Test Model* 3", Specifically Section 2.3.1.2: Spatial-temporal motion vector prediction (STMVP).

d. History-Based Merge Mode and AMVP

A video coder implementing history-based merge mode may store some previous CU's merge candidates in a history array. For the CU currently being encoded or decoded, the video coder may use one or more candidates inside the history array to enhance the original merge mode candidates. The history-based method is also applicable to AMVP candidate list. History-based Merge mode is described in: Joint Video Experts Team (JVET) of ITU-T SG 16 WP 3 and ISO/IEC JTC 1/SC 29/WG 11, 11th Meeting: Ljubljana, Sl, 10-18 Jul. 2018, Document: JVET-K0104, "CE4-related: History-based Motion Vector Prediction".

e. Non-Adjacent Merge Mode and AMVP

A non-adjacent merge candidate uses some spatial candidates far away from the current CU. The Non-adjacent-based method may also be applied to AMVP candidate list. An example of Non-Adjacent Merge mode is shown in: Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0228, Title: "CE 4-2.1: Adding non-adjacent spatial merge candidates". An example of Non-Adjacent Merge Candidate is described in: Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0286, Title: "CE4: Additional merge candidates (Test 4.2.13)"

f. Affine Merge Mode

HEVC uses only translation motion model for motion compensation prediction. There are many other types of motions in the real world, such as zoom-in and zoom-out, rotation, perspective motions, and other irregular motions. Some of these other types of motions may be represented by affine transformation or affine motion, which preserves points, straight lines and planes. An affine transformation does not necessarily preserve angles between lines or distances between points, but it does preserve ratios of distances between points lying on a straight line. When an affine motion block is moving, the motion vector field of the block can be described by two control point motion vectors or four parameters as the following:

$$\begin{cases} x' = ax + by + e \\ y' = -bx + ay + f \\ vx = x - x' \\ vy = y - y' \end{cases} \Rightarrow \begin{cases} vx = (1-a)x - by - e \\ vy = (1-a)y + bx - f \end{cases}$$

Figure 10:
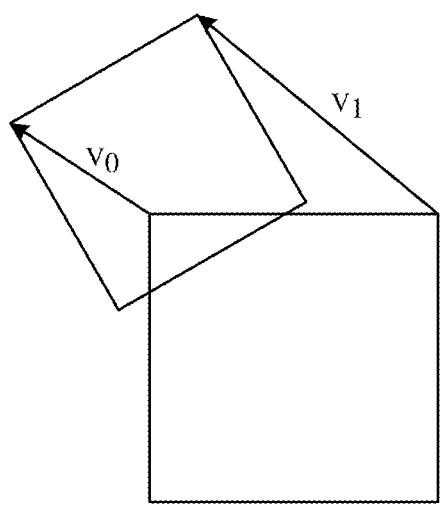
FIG. 10 illustrates a four-parameter affine motion model.

The transformed block is a rectangular block. The motion vector field of each point in this moving block can be described by the following equation for 4-parameter affine model:

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases}$$

or an equation for 6-parameter affine model:

$$\begin{cases} v_x = \frac{(v_{1x} - v_{0x})}{x_1 - x_0} x + \frac{(v_{2x} - v_{0x})}{x_2 - x_0} y + v_{0x} \\ v_y = -\frac{(v_{1y} - v_{0y})}{x_1 - x_0} x + \frac{(v_{2y} - v_{0y})}{y_2 - x_0} y + v_{0y} \end{cases}$$

Where ($v_{0x}$, $v_{0y}$) is the control point motion vector on top left corner, and ($v_{1x}$, $v_{1y}$) is another control point motion vector on above right corner of the block. In some embodiments, for a inter mode coded CU, when the CU size is equal to or larger than 16×16, an affine_flag is signaled to indicate whether the affine inter mode is applied or not. If the current CU is in affine inter mode, a candidate MVP pair list is built using the neighbor valid reconstructed blocks. FIG. 10 illustrates a four-parameter affine motion model.

Figure 11:
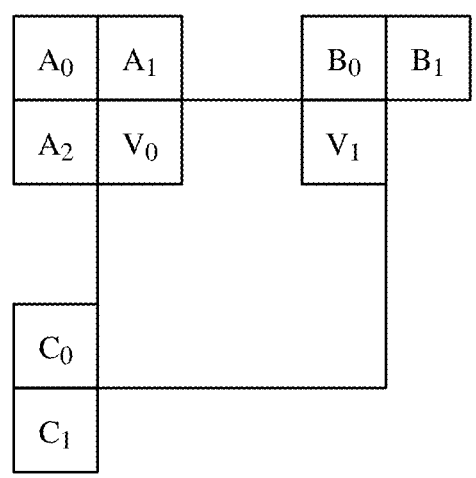
FIG. 11 illustrates Motion Vector Predictor (MVP) derivation for affine inter mode.

FIG. 11 illustrates MVP derivation for affine inter mode. As shown in FIG. 11, the $v_0$ is selected from the motion vectors of the block $A_0$, $A_1$ or $A_2$, and the $v_1$ is selected from the motion vectors of the block $B_0$ and $B_1$. The index of candidate MVP pair is signaled in the bit stream. The MV difference (MVD) of the two control points are coded in the bitstream.

In some embodiments, if the current PU is a merge PU, the neighboring five blocks ($C_0$, $B_0$, $B_1$, $C_1$, and $A_0$ blocks in FIG. 11) are checked whether one of them is affine inter mode or affine merge mode. If yes, an affine_flag is signaled to indicate whether the current PU is affine mode. When the current PU is coded in affine merge mode, the first block is coded by affine mode from valid neighbor reconstructed blocks. The selection order for the candidate block is from left, above, above-right, left-bottom to above-left ($C_0 \rightarrow B_0 \rightarrow B_1 \rightarrow C_1 \rightarrow A_0$) as shown in FIG. 11. The affine parameter of the first affine coded block is used to derive the $v_0$ and $v_1$ for the current PU.

In some embodiments, the root CU (or said the parent CU) or the share boundary size/depth/shape/width/height is used to derive the candidate list. In candidate list derivation, for any position-based derivation, e.g. derivation of the reference block position according to the current block/CU/PU position/size/depth/shape/width/height, the root CU or the share boundary position and shape/size/depth/width/height are used. In some embodiments, for affine inherit candidate derivation, the reference block position is first derived. When applying the share list, the reference block position is derived by using the root CU or the share boundary position and shape/size/depth/width/height. In one example, the reference block positions are stored. When the child CU in the root CU or the share boundary, the stored reference block positions are used to find the reference block for affine candidate derivation. In another example, when the coding the child CU, the position and shape/width/height/size of the root CU or the share boundary can be stored or derived for the affine candidate reference block derivation. The 4-parameter affine model and/or the 6-parameter affine model can be used to derive the affine candidate or the control point MVs. For example, in FIG. 14, the CU inside of the root CU can reference block $A_0$, $A_1$, $B_0$, $B_1$, $B_2$ and collocated block TBR and TC to derive the affine candidate.

In some embodiments, for affine inherit candidate derivation, the current child CU position and shape/size/depth/width/height are used. If the reference block is inside of the root CU or the share boundary, it is not used for deriving the affine candidate.

g. Shared Candidate List

To simplify the codec operation complexity, some embodiments provide a method of using a shared candidate list to encode or decode multiple blocks of pixels. A candidates list refers to merge mode or AMVP mode candidate list, or other type of prediction candidate list (such as DMVR or bi-lateral refinement candidate list, affine merge mode, sub-block merge mode, affine inter/AMVP mode, IBC merge, IBC AMVP). A shared candidate list is a candidate list that is generated based on a boundary that is bigger than a leaf CU (e.g. a parent CU, or one root of a sub-tree in QTBT or QTBTTT Tree, or one node of QT tree), and the generated candidate list can be shared for all leaf CUs inside the boundary or inside the sub-tree. In some embodiments, shared merge region (SMR) is used to denote the common ancestor node region for the shared candidate list.

In some embodiments, a shared candidate list is a candidate list that is shared by CUs within or encompassed by a common shared boundary, also referred to as a shared boundary. For some embodiments, a "shared boundary" is defined as a rectangular area of minimum-blocks (a minimum-block is usually 4×4) that are aligned inside a picture. Every CU inside the "shared boundary" may use a common shared candidate list that is generated based on the "shared boundary". Specifically, the candidates of the shared candidate list include spatial neighbor positions and the temporal neighboring positions that are based on the "shared boundary", or the region defined by the shared boundary. The shared boundary may be a square block or a non-square block. The size/depth/width/height of the shared boundary may be signaled in a bitstream at sequence-level, picture-level, or slice-level.

Figure 12:
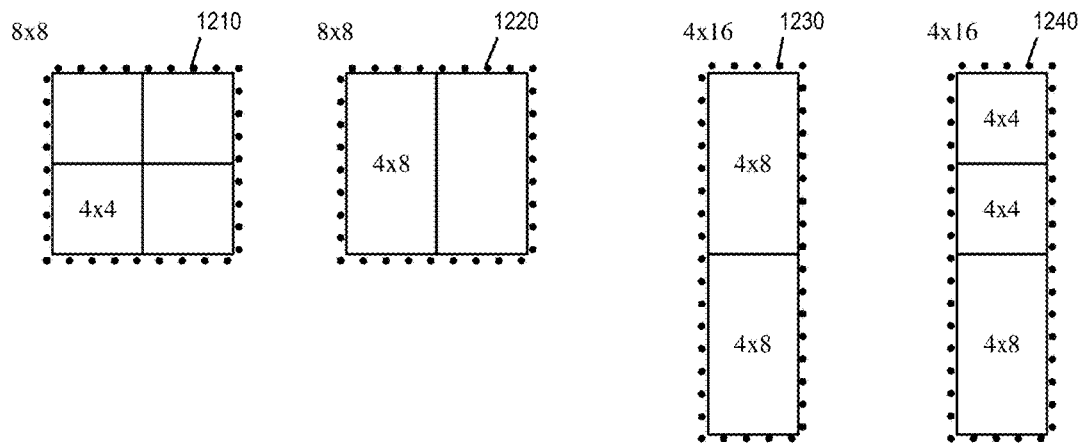
FIG. 12 illustrates several examples of share boundaries that are used to define or identify shared candidate lists.

FIG. 12 illustrates several examples of share boundaries that are used to define or identify shared candidate lists. The examples include: a square shared boundary 1210 that corresponds to a 8×8 CU that is QT split into four 4×4 CUs; a square shared boundary 1220 that corresponds to a 8×8 CU that is BT split into two 4×8 CUs; a rectangular shared boundary 1230 that corresponds to a 4×16 root CU that is BT split into two 4×8 CUs; and a rectangular shared boundary 1240 that corresponds to a 4×16 CU that is TT split into two 4×4 CUs and one 4×8 CU. The CU that corresponds to a shared boundary is also referred to as the root CU of the shared boundary.

Figure 13:
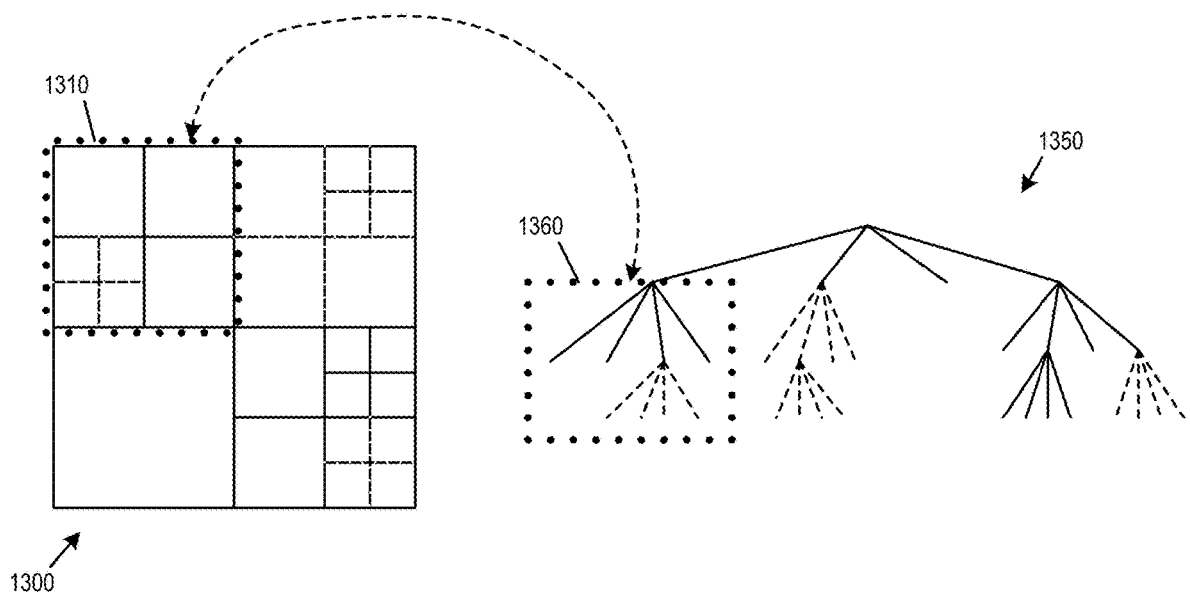
FIG. 13 illustrates a sub-tree of a split tree that correspond to CUs in a shared boundary that may be coded by a shared candidate list.

In some embodiments, a shared candidate list is a candidate list that is shared by CUs within a sub-tree. A "sub-tree" may refer to a sub-tree of QTBT, QTBTTT, or a split tree of another type. FIG. 13 illustrates a sub-tree of a split tree that correspond to CUs in a shared boundary that may be coded by a shared candidate list. The figure illustrates a CTU 1300 whose split structure is represented by a hierarchical tree 1350, which is a QTBT or QTBTTT split tree. Within the CTU 1300, a shared boundary 1310 defines a root CU, which is split into several sub-CUs of various split depths. The sub-CUs encompassed by the shared boundary 1310 correspond to nodes in a sub-tree 1360 in the split tree 1350, and leaf nodes in the sub-tree 1360 correspond to leaf CUs in the shared boundary 1310. In other words, the shared candidate list is shared by leaf nodes of the sub-tree 1360.

The shared candidate list can be generated based on a shared-block-boundary, e.g., a root CU boundary such as the shared boundary 1310 or the sub-tree 1360. The shared candidate list is re-used for some or all leaf CUs inside the sub-tree. The shared candidate list is generated for the root of the sub-tree, that is, the spatial neighbor positions and the temporal neighboring positions of the candidates of the shared candidate list are identified based on the rectangular boundary (or shared boundary) of the root CU or the sub-tree.

The candidates of the shared candidate list are prediction candidates that are identified based on spatial or temporal neighbors of a region defined by the shared boundary. One or more CUs encompassed by the shared boundary are then coded by using one or more prediction candidates selected from the shared candidate list.

Figure 14:
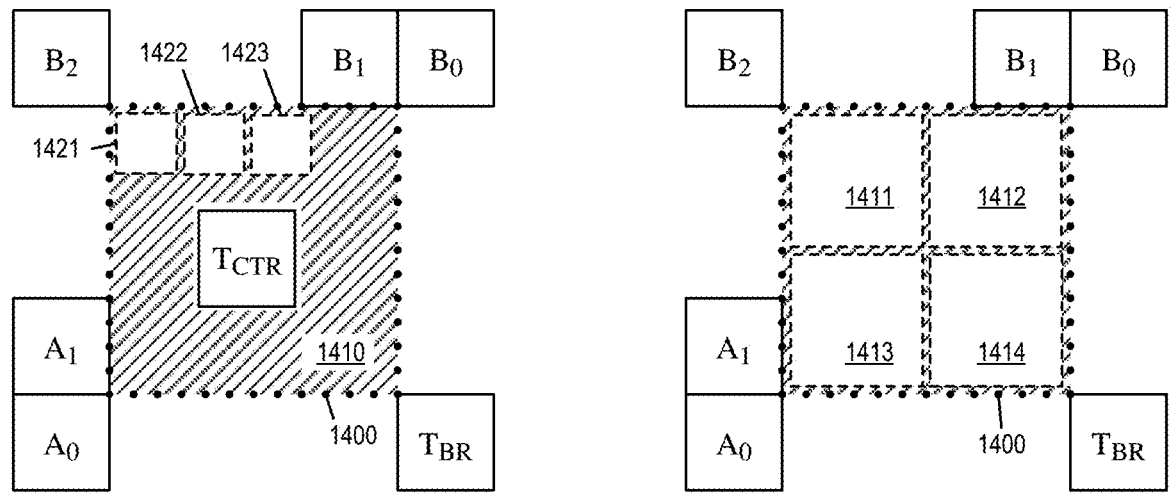
FIG. 14 illustrates a shared boundary that is used to identify a shared candidate list.

FIG. 14 illustrates a shared boundary 1400 that is used to identify a shared candidate list. The shared boundary 1400 defines a region 1410. The region 1410 may correspond to a CU. The region 1410 may be part of a split tree or CTU (e.g., BT, QT, MTT, etc.) and may be split into sub-CUs such as CUs 1411, 1412, 1413, and 1414. A sub-CU may be a leaf CU that cannot be further split. A sub-CU may also be split into sub-CUs of greater split depths until leaf CUs are reached. In the example, the region 1410 (or a root CU that correspond to the region 1410) defined by the shared boundary 1400 is split into several leaf CUs, including leaf CUs 1421, 1422, and 1423.

The leaf CUs 1421, 1422, and 1423 are all coded by using the shared candidate list that is identified or defined based on the shared boundary 1400. The shared candidate list may be a merge mode list, AMVP list, IBC merge list, IBC AMVP List, or a prediction candidate list of another type. The share candidate list may include prediction candidates that are derived (e.g., inherited) from neighbors of the region 1410, e.g., spatial MVPs from spatial neighbors $A_0, A_1, B_0, B_1, B_2$ and temporal MVPs from temporal neighbors $T_{BR}, T_{CTR}$. Generally, the shared candidate list may include merge mode, AMVP mode candidates, IBC merge mode candidates, IBC AMVP mode candidates, affine merge mode candidates, sub-block merge mode candidates, affine AMVP mode candidates, or prediction candidates of other types. The shared candidate list may also include one or more CPR or IBC candidates that refer to already-reconstructed reference samples in the current picture.

h. Merge Estimation Region (MER)

Merge Estimation Region (MER) is a region in which a candidate block that is in the same MER (as the current block being coded) is excluded from the merge candidate list (of the current block being coded). When MER is applied, a spatial merge candidate can be added into merging candidate list only when the current CU and the neighboring CU providing the spatial merge candidate are in the different MERs. Thus, a video coder may ensure that a spatial merge candidate of the current CU can be independently derived (e.g., using parallel processing) by checking whether the corresponding neighboring CU is in the same MER region as the current CU.

Figure 15:
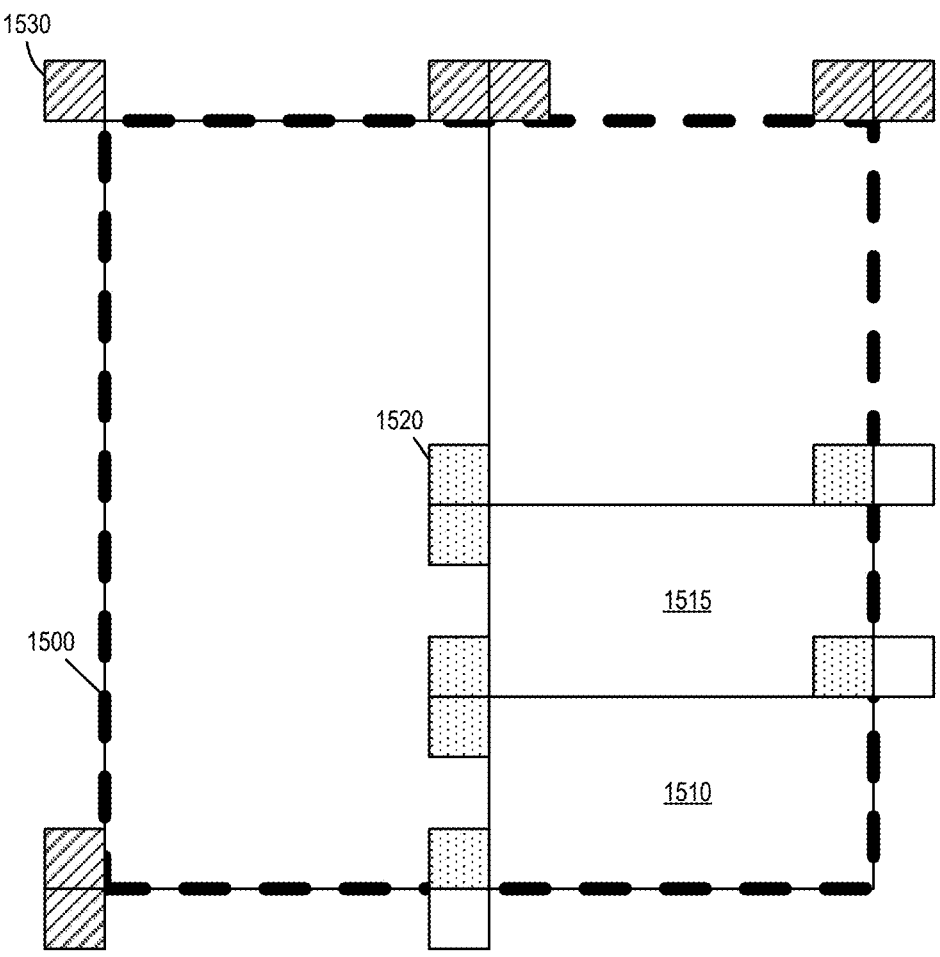
FIG. 15 conceptually illustrates spatial merge candidates of CUs that are identified based on a Merge Estimation Region (MER).

FIG. 15 conceptually illustrates spatial merge candidates of CUs that are identified based on a Merge Estimation Region (MER). As illustrated, a MER 1500 is defined to encompass a CU 1510 and a CU 1515. Neighboring blocks of the CUs 1510 and 1515 that are within the MER 1500 (e.g., spatial neighbor 1520) are not available to provide spatial merge candidate for coding the CU 1510. Already-coded Neighboring blocks that are outside of the MER 1500 (e.g., spatial neighbor 1530) are available to provide spatial merge candidates.

MER can be extended to the QTBT or the QTBTTT structure. The MER can be non-square. The MER can be in difference shape or size depends on the structure partition. The size/depth/area/width/height can be predefined or signaled in sequence/picture/slice-level. For the width/height of the MER, the log 2 value of the width/height can be signaled. For the area/size of the MER, the log 2 value of the size/area can be signaled. When a MER is defined for a region, the CU/PU in this MER cannot be used as the reference CU/PU for merge mode candidate derivation. For example, the MVs or the affine parameters of the CU/PU in this MER cannot be referenced by the CU/PU in the same MER for merge candidate or affine merge candidate derivation. Those MVs and/or affine parameters are treated as unavailable for the CU/PU in the same MER. When a MER area/size/depth/shape/area/width/height is defined (e.g. predefined or signaled), if the current CU is larger than or equal to the defined area/size/shape/area/width/height and one of the child partition or all of the child partition or part of the child partition is smaller than the area/size/shape/area/width/height (or if the depth of the current CU is smaller than or equal to the defined depth and the depth of one of child partition or all of the child partition or part of the child partition is larger than the defined depth), the current CU is one MER. In another embodiment, if the current CU is smaller than or equal to the defined area/size/shape/area/width/height and the parent CU is larger than the defined area/size/shape/area/width/height (or if the depth of the current CU is larger than or equal to the defined depth and the parent is smaller than the defined depth), the current CU is one MER. For example, if the defined area is 1024 and a CU size is 64×32 (width is 64 and height is 32), and the vertical TT split is used (the 64×32 CU is partitioned into a 16×32 sub-CU, a 32×32 sub-CU, and a 16×32 sub-CU), in one embodiment, the 64×32 is the MER. The child CU in this 64×32 use the share list. In another embodiment, the 64×32 is not the MER, but the 16×32 sub-CU, the 32×32 sub-CU, and the 16×32 sub-CU are MERs, respectively. In another embodiment, for a defined MER area/size/depth/shape/area/width/height, when doing the TT split, the MER area/size/depth/shape/area/width/height can be different in different TT partition. For example, for a first partition and a second partition, the threshold of MER area/size/shape/area/width/height can be divided by 2 (or the depth can be increased by 1), while for a third partition, the threshold of MER area/size/depth/shape/area/width/height may remain the same.

In some embodiments, the MER is defined for the QT partition or the QT split CU. If the QT CU is equal to or large than the defined area/size/QT-depth/shape/area/width/height, the MER is defined as the leaf QT CU area/size/QT-depth/shape/area/width/height. All the sub-CUs (e.g. portioned by BT or TT) inside the QT leaf CU use the QT leaf CU as MER. The MER includes all the sub-CUs in this leaf QT CU. If a QT CU (not a QT leaf CU) is equal to the defined area/size/QT-depth/shape/area/width/height, this QT CU is used as a MER. All the sub-CUs (e.g. portioned by QT, BT, or TT) inside the QT CU are included in this MER. In one embodiment, the area/size/QT-depth/shape/area/width/height of the MER is used to derive the reference block position. In another embodiment, the area/size/QT-depth/shape/area/width/height of the current CU is used to derive the reference block position. If the reference block position is inside of the MER, the reference block position is moved outside of the MER. In another example, the area/size/QT-depth/shape/area/width/height of the current CU is used to derive the reference block position. If the reference block position is inside of the MER, the reference block is not used for the merge candidate or affine merge candidate derivation.

In the above mentioned depth, the depth can be equal to (((A*QT-depth)>>C)+((B*MT-depth)>>D)+E)>>F+G or (((A*QT-depth)>>C)+((B*BT-depth)>>D)+E)>>F+G, where the A, B, C, D, E, F, G are integers. For example, depth can be equal to 2*QT-depth+MT-depth or 2*QT-depth+BT-depth or QT-depth+MT-depth or QT-depth+BT-depth. In some embodiments, the MER region cannot cross the picture boundary. That is, the MER region must be all inside the picture, no pixels of MER region exist outside the picture boundary. MER can also be applied to AMVP mode in addition to merge or affine merge. The QTMTT-based MER can be applied to all candidate-derivation tool (such as AMVP, merge, affine merge, and so on).

In some embodiments, both MER and Shared list may be enabled in QTMTT structure. In some embodiments, for normal merge and ATMVP, shared list is used; and for affine merge, QTMTT-based MER is used. In some embodiments, for some prediction mode, shared list is used, while for other merge mode or AMVP mode, MER is used.

i. History-Based Merge Candidates Derivation

The history-based MVP (HMVP) merge candidates are added to merge list after the spatial MVP and TMVP. In HMVP, the motion information of a previously coded block is stored in a table and used as MVP for the current CU. A table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In some embodiments, the HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward. HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, some embodiments use the following simplifications:

(1) Number of HMPV candidates is used for merge list generation is set as (N<=4)?M: (8−N), wherein N indicates number of existing candidates in the merge list and M indicates number of available HMVP candidates in the table.

(2) Once the total number of available merge candidates reaches the maximally allowed merge candidates minus 1, the merge candidate list construction process from HMVP is terminated.

j. Intra Block Copy (IBC)

Intra Block Copy (IBC) is also referred to as Current Picture Referencing (CPR). An IBC (or CPR) motion vector is one that refers to the already-reconstructed reference samples in the current picture. For some embodiments, IBC prediction mode is treated as the third prediction mode other than intra or inter prediction modes for coding a CU.

Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision.

The chroma block vector rounds to integer precision as well. When combined with AMVR, the IBC mode can switch between 1-pel and 4-pel motion vector precisions. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed. In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs. At CU level, IBC mode is signaled with a flag that can be signaled as IBC AMVP mode or IBC skip/merge mode as follows:

IBC skip/merge mode: a merge candidate index is used to indicate which of the block vectors in the list from neighboring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

Figure 16:
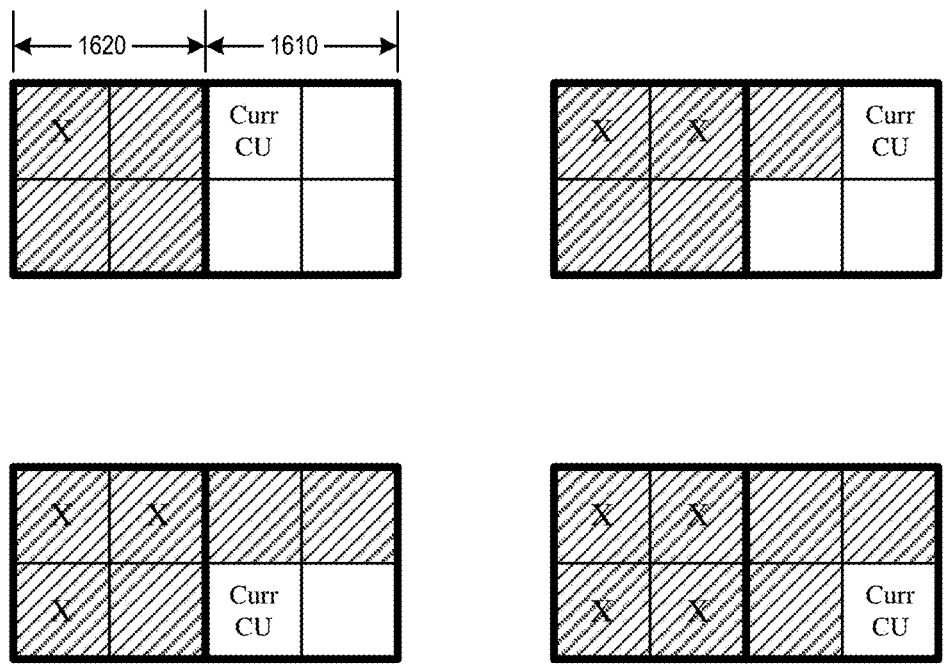
FIG. 16 illustrates the reference region of Intra Block Copy (IBC) Mode.

In some embodiments, in order to reduce memory consumption and decoder complexity, IBC allows only the reconstructed portion of the predefined area including the region of current CTU and some region of the left CTU. FIG. 16 illustrates the reference region of IBC Mode, where each block represents 64×64 luma sample unit. The figure shows current CTU processing order and its available reference samples in the current CTU 1610 and a left CTU 1620.

Depending on the location of the current coding CU location within the current CTU, the following applies:

If the current block (or current coding CU) falls into the top-left 64×64 block of the current CTU, then in addition to the already reconstructed samples in the current CTU, it can also refer to the reference samples in the bottom-right 64×64 blocks of the left CTU, using CPR mode. The current block can also refer to the reference samples in the bottom-left 64×64 block of the left CTU and the reference samples in the top-right 64×64 block of the left CTU, using CPR mode.

If the current block falls into the top-right 64×64 block of the current CTU, then in addition to the already reconstructed samples in the current CTU, if luma location (0, 64) relative to the current CTU has not yet been reconstructed, the current block can also refer to the reference samples in the bottom-left 64×64 block and bottom-right 64×64 block of the left CTU, using CPR mode; otherwise, the current block can also refer to reference samples in bottom-right 64×64 block of the left CTU.

If the current block falls into the bottom-left 64×64 block of the current CTU, then in addition to the already reconstructed samples in the current CTU, if luma location (64, 0) relative to the current CTU has not yet been reconstructed, the current block can also refer to the reference samples in the top-right 64×64 block and bottom-right 64×64 block of the left CTU, using CPR mode. Otherwise, the current block can also refer to the reference samples in the bottom-right 64×64 block of the left CTU, using CPR mode.

If the current block falls into the bottom-right 64×64 block of the current CTU, it can only refer to the already reconstructed samples in the current CTU, using CPR mode.

For some embodiments, these restrictions allow the IBC mode to be implemented using local on-chip memory for hardware implementations.

The interaction between IBC mode and other inter coding tools, such as pairwise merge candidate, history-based motion vector predictor (HMVP), combined intra/inter prediction mode (CIIP), merge mode with motion vector difference (MMVD), and triangle partition are as follows:

IBC can be used with pairwise merge candidate and HMVP. A new pairwise IBC merge candidate can be generated by averaging two IBC merge candidates. For HMVP, IBC motion is inserted into history buffer for future referencing.

IBC cannot be used in combination with the following inter tools: affine motion, CIIP, MMVD, and triangle partition.

IBC is not allowed for the chroma coding blocks when DUAL_TREE partition is used.

Unlike in the HEVC screen content coding extension, the current picture is no longer included as one of the reference pictures in the reference picture list 0 for IBC prediction. The derivation process of motion vectors for IBC mode excludes all neighboring blocks in inter mode and vice versa. The following IBC design aspects are applied:

IBC shares the same process as in regular MV merge including with pairwise merge candidate and history-based motion predictor, but disallows TMVP and zero vector because they are invalid for IBC mode.

Separate HMVP buffer (5 candidates each) is used for conventional MV and IBC.

Block vector constraints are implemented in the form of bitstream conformance constraint, the encoder needs to ensure that no invalid vectors are present in the bitstream, and merge shall not be used if the merge candidate is invalid (out of range or 0). Such bitstream conformance constraint is expressed in terms of a virtual buffer as described below.

For deblocking, IBC is handled as inter mode.

If the current block is coded using IBC prediction mode, AMVR does not use quarter-pel; instead, AMVR is signaled to only indicate whether MV is inter-pel or 4 integer-pel.

The number of IBC merge candidates can be signaled in the slice header separately from the numbers of regular, subblock, and triangle merge candidates.

In some embodiments, a virtual buffer is used to describe the allowable reference region for IBC prediction mode and valid block vectors. CTU size is denoted as ctbSize. The virtual buffer is denoted as ibcBuf. The virtual buffer has width wIbcBuf=128*128/ctbSize and height hIbcBuf=ctbSize. For example, for a CTU size of 128×128, the size of ibcBuf is also 128×128; for a CTU size of 64×64, the size of ibcBuf is 256×64; and a CTU size of 32×32, the size of ibcBuf is 512×32. The size of a VPDU is min (ctbSize, 64) in each dimension, Wv=min(ctbSize, 64). The virtual IBC buffer, ibcBuf is maintained as follows.

At the beginning of decoding each CTU row, refresh the whole ibcBuf with an invalid value −1.

At the beginning of decoding a VPDU (xVPDU, yVPDU) relative to the top-left corner of the picture, set the ibcBuf[x][y]=−1, with x=xVPDU % wIbcBuf, xVPDU % wIbcBuf+$W_v$−1; y=yVPDU % ctbSize, yVPDU % ctbSize+$W_v$−1.

After decoding a CU contains (x, y) relative to the top-left corner of the picture, set ibcBuf[x % wIbcBuf][y]% ctbSize=recSample[x][y]

For a block covering the coordinates (x, y), if the following is true for a block vector bv=(bv[0], bv[1]), then it is valid; otherwise, it is not valid:

Also, ibcBuf[(x+bv[0])% wIbcBuf] [(y+bv[1]) % ctbSize] shall not be equal to −1.

k. Extended Merge Prediction

In some embodiments, the merge candidate list is constructed by including the following five types of candidates:

Spatial MVP from spatial neighbour CUs
Temporal MVP from collocated CUs
History-based MVP from a FIFO table
Pairwise average MVP
Zero MVs.

In some embodiments, the size of merge list is signalled in slice header. The maximum allowed size of merge list is 6. For each CU code in merge mode, an index of best merge candidate is encoded using truncated unary binarization (TU). The first bin of the merge index is coded with context and bypass coding is used for other bins.

Figure 17:
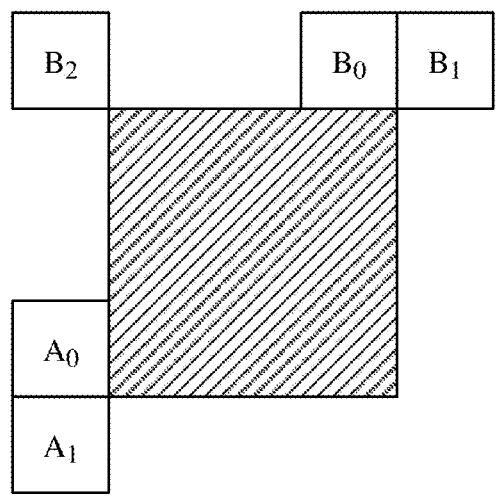
FIG. 17 shows positions of spatial merge candidates.
Figure 18:
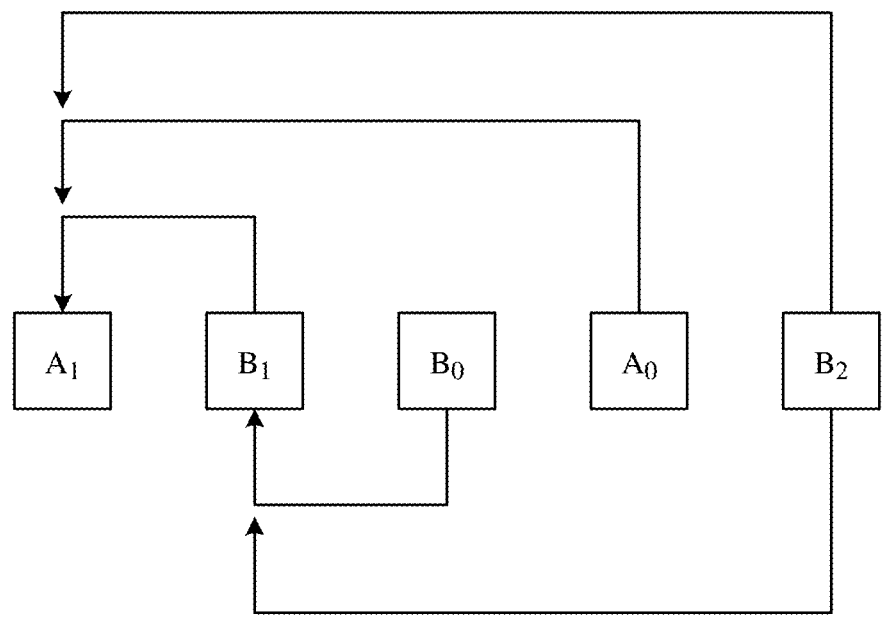
FIG. 18 candidate pairs considered for redundancy check of spatial merge candidates.

FIG. 17 shows positions of spatial merge candidates. FIG. 18 candidate pairs considered for redundancy check of spatial merge candidates. In some embodiments, a maximum of four merge candidates are selected among candidates located in the positions $A_0$, $B_0$, $B_1$, $A_1$ and $B_2$ as shown in FIG. 17. Position $B_2$ is considered only when any CU of position $A_0$, $B_0$, $B_1$, $A_1$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow as shown in FIG. 18 are considered and a candidate is only added to the list if the corresponding candidate used for redundancy check has not the same motion information.

Figure 19:
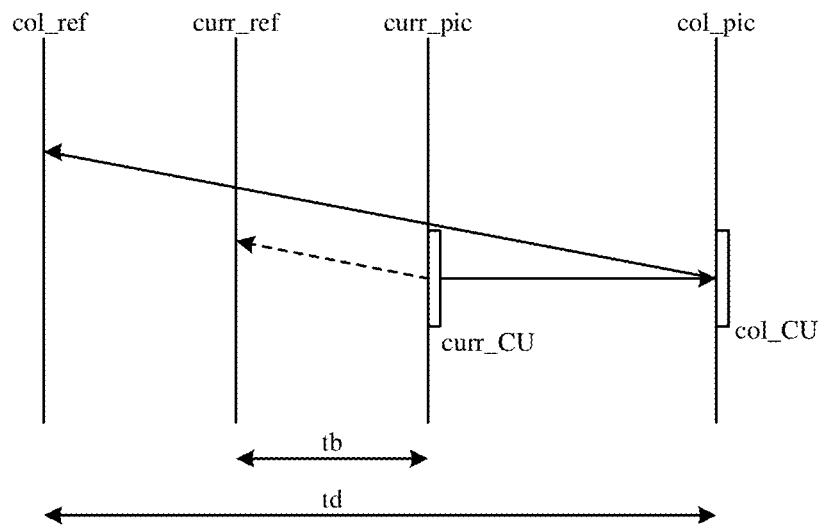
FIG. 19 illustrates motion vector scaling for temporal merge candidate.

In this step, only one candidate is added to the list. Particularly, in the derivation of this temporal merge candidate, a scaled motion vector is derived based on co-located CU belonging to the collocated reference picture. FIG. 19 illustrates motion vector scaling for temporal merge candidate. The reference picture list to be used for derivation of the co-located CU is explicitly signaled in the slice header. The scaled motion vector for temporal merge candidate is obtained as illustrated by the dotted line in FIG. 19, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 20:
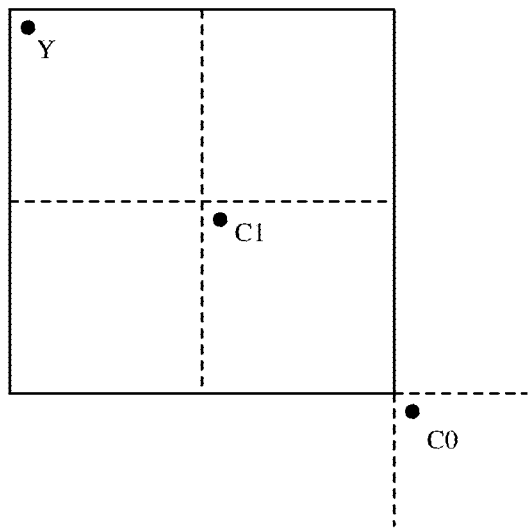
FIG. 20 depicts the position for the temporal candidate that is selected between candidates $C_0$ and $C_1$.

FIG. 20 depicts the position for the temporal candidate that is selected between candidates $C_0$ and $C_1$. If CU at position $C_0$ is not available, is intra coded, or is outside of the current row of CTUs, position $C_1$ is used. Otherwise, position $C_0$ is used in the derivation of the temporal merge candidate.

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In some embodiments, the HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

Number of HMPV candidates is used for merge list generation is set as (N<=4)?M: (8−N), wherein N indicates number of existing candidates in the merge list and M indicates number of available HMVP candidates in the table.

Once the total number of available merge candidates reaches the maximally allowed merge candidates minus 1, the merge candidate list construction process from HMVP is terminated.

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. When the merge list is not full after pair-wise average merge candidates are added, the zero MVPs are inserted in the end until the maximum merge candidate number is encountered.

l. Merge Mode with Motion Vector Difference (MMVD)

In addition to merge mode, where the implicitly derived motion information is directly used for prediction samples generation of the current CU, the merge mode with motion vector differences (MMVD) is included. In some embodiments, a MMVD flag is signaled after sending a skip flag and merge flag to specify whether MMVD mode is used for a CU.

In MMVD, after a merge candidate is selected, it is further refined by the signaled MVDs information. The further information includes a merge candidate flag, an index to specify motion magnitude, and an index for indication of motion direction. In MMVD mode, one for the first two candidates in the merge list is selected to be used as MV basis. The merge candidate flag is signaled to specify which one is used.

Figure 21:
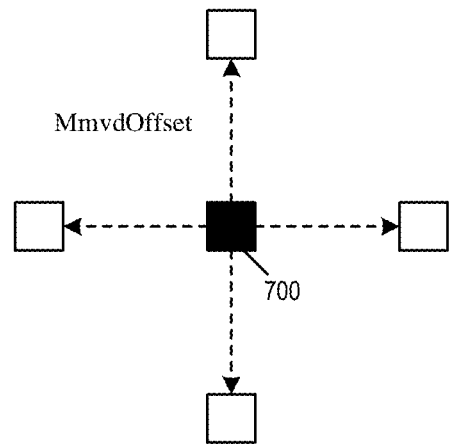
FIG. 21 shows an offset is added to either horizontal component or vertical component of starting MV.

In some embodiments, distance index specifies motion magnitude information and indicate the pre-defined offset from the starting point. As shown in FIG. 21, an offset is added to either horizontal component or vertical component of starting MV. The relation of distance index and pre-defined offset is specified in Table I-1 below:

TABLE I-1

Distance Index

| | Distance IDX | | | | | | | |
|---|---|---|---|---|---|---|---|---|
| | 0 | 1 | 2 | 3 | 4 | 5 | 6 | 7 |
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table I-2. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table I-2 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table I-2 specifies the sign of MV offset added to the list0 MV component of starting MV and the sign for the list1 MV has opposite value.

TABLE I-2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

In some embodiments, in addition to the normal unidirectional prediction and bi-directional prediction mode MVD signaling, symmetric MVD mode for bi-predictional MVD signalling is applied. In the symmetric MVD mode, motion information including reference picture indices of both list-0 and list-1 and MVD of list-1 are not signaled but derived. The decoding process of the symmetric MVD mode is as follows:

At slice level, variables BiDirPredFlag, RefIdxSymL0 and RefIdxSymL1 are derived according to:

If mvd_l1_zero_flag is 1, BiDirPredFlag is set equal to 0.

Otherwise, if the nearst reference picture in list-0 and the nearst reference picture in list-1 form a forward and backward pair of reference pictures or a backward and forward pair of reference pictures, BiDirPredFlag is set to 1, and both list-0 and list-1 reference pictures are short-term reference pictures. Otherwise BiDirPredFlag is set to 0.

At CU level, a symmetrical mode flag indicating whether symmetrical mode is used or not is explicitly signaled if the CU is bi-prediction coded and BiDirPredFlag is equal to 1. When the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0). The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 + mvdy_0) \end{cases}$$

In the encoder, symmetric MVD motion estimation starts with initial MV evaluation. A set of initial MV candidates comprising of the MV obtained from uni-prediction search, the MV obtained from bi-prediction search and the MVs from the AMVP list. The one with the lowest rate-distortion cost is chosen to be the initial MV for the symmetric MVD motion search.

m. Affine Candidates

Affine merge prediction, or AF_MERGE mode can be applied for CUs with both width and height larger than or equal to 8. In this mode the motion vectors associated with control points in the affine model, or control point motion vectors (CPMVs) of the current CU is generated based on the motion information of the spatial neighboring CUs. There can be up to five CPMVP candidates and an index is signalled to indicate the one to be used for the current CU. The following three types of CPMV candidate are used to form the affine merge candidate list:

Inherited affine merge candidates that extrapolated from the CPMVs of the neighbour CUs Constructed affine merge candidates CPMVPs that are derived using the translational MVs of the neighbour CUs Zero MVs Constructed affine candidate means the candidate is constructed by combining the neighbor translational motion information of each control point. The motion information for the control points is derived from the specified spatial neighbors and temporal neighbor.

Affine AMVP prediction, or Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:

Inherited affine AMVP candidates that extrapolated from the CPMVs of the neighbour CUs.

Constructed affine AMVP candidates CPMVPs that are derived using the translational MVs of the neighbour CUs.

Translational MVs from neighboring CUs

Zero MVs.

The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

In some embodiments, the CPMVs of affine CUs are stored in a separate buffer. The stored CPMVs are only used to generate the inherited CPMVPs in affine merge mode and affine AMVP mode for the lately coded CUs. The subblock MVs derived from CPMVs are used for motion compensation, MV derivation of merge/AMVP list of translational MVs and de-blocking.

To avoid the picture line buffer for the additional CPMVs, affine motion data inheritance from the CUs from above CTU is treated differently to the inheritance from the normal neighboring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in local buffer. If the candidate CU is 6-parameter affine coded, the affine model is degraded to 4-parameter model.

n. Subblock-Based Temporal Motion Vector Prediction (SbTMVP)

In some embodiments, subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in that (1) TMVP predicts motion at CU level but SbTMVP predicts motion at sub-CU level; and (2) whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 22:
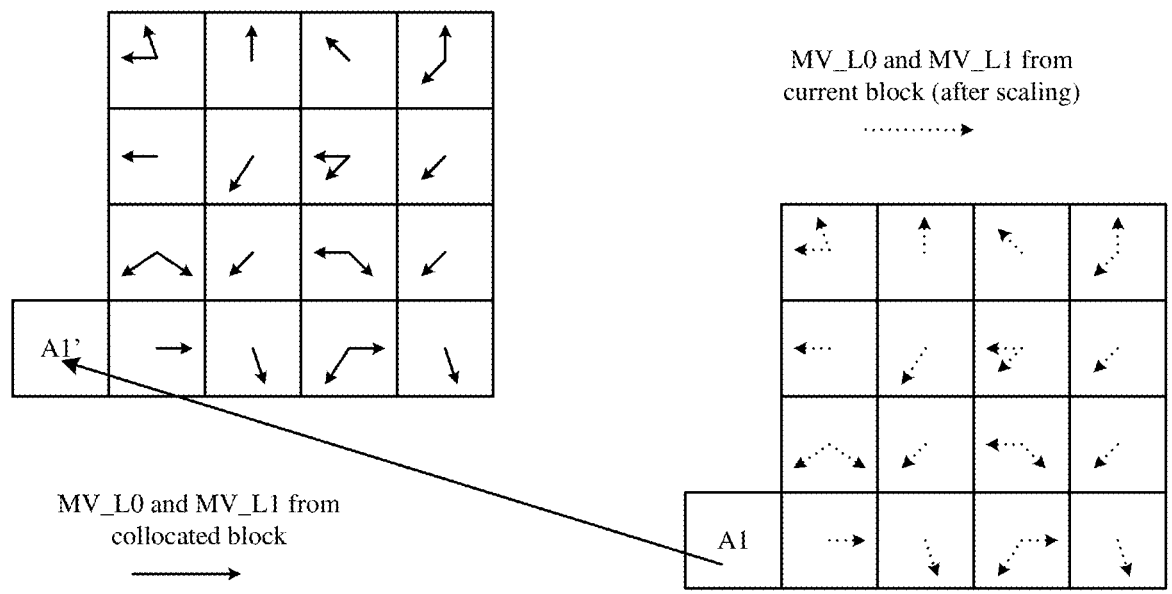
FIG. 22 conceptually illustrates the SbTVMP process, specifically Deriving sub-CU motion field by applying a motion shift from spatial neighbor and scaling the motion information from the corresponding collocated sub-CUs.

FIG. 22 conceptually illustrates the SbTVMP process, specifically Deriving sub-CU motion field by applying a motion shift from spatial neighbor and scaling the motion information from the corresponding collocated sub-CUs. SbTMVP predicts the motion vectors of the sub-CUs within the current CU in two steps. In the first step, the spatial neighbor A1 in FIG. 22 is examined. If A1 has a motion vector that uses the collocated picture as its reference picture, this motion vector is selected to be the motion shift to be applied. If no such motion is identified, then the motion shift is set to (0, 0). In the second step, the motion shift identified in the first step is applied (i.e. added to the current block's coordinates) to obtain sub-CU-level motion information (motion vectors and reference indices) from the collocated picture as shown in FIG. 22. The example in FIG. 22 assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In some embodiments, a combined subblock based merge list which contains both SbTVMP candidate and affine merge candidates is used for the signalling of subblock based merge mode. The SbTVMP mode is enabled/disabled by a sequence parameter set (SPS) flag. If the SbTMVP mode is enabled, the SbTMVP predictor is added as the first entry of the list of subblock based merge candidates and followed by the affine merge candidates. In some embodiments, the size of subblock based merge list is signaled in SPS and the maximum allowed size of the subblock based merge list is 5. The sub-CU size used in SbTMVP is fixed to be 8×8, and as done for affine merge mode, SbTMVP mode is only applicable to the CU with both width and height are larger than or equal to 8. The encoding logic of the additional SbTMVP merge candidate is the same as for the other merge candidates, that is, for each CU in P or B slice, an additional RD check is performed to decide whether to use the SbTMVP candidate.

o. Geometric Partition Mode (GPM)

Under geometry partitioning, a transform block may contain pixels belonging to multiple (e.g., two) different partitions, and multiple different motion vectors are used for motion compensation of the multiple different partitions. Consequently, the pixels at boundaries between different partitions may have large discontinuities that can produce visual artifacts similar to blockiness. This in turn decreases the transform efficiency.

Figures 23, 24:
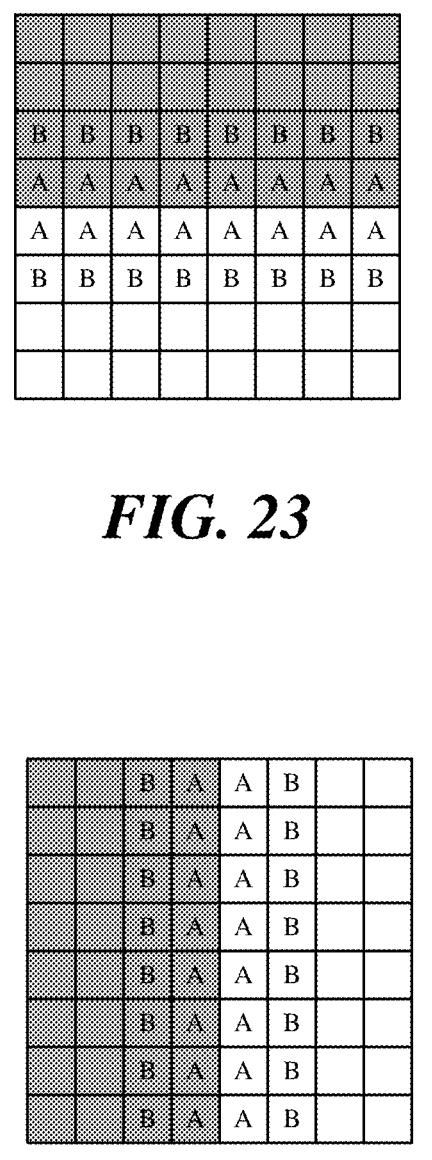

FIGS. 23 and 24 illustrates regions of a pixel block created by geometric partitioning. Grey-shaded pixels belong to region 1 and white-shade pixels belong to region 2. A pixel of region 1 (or region 2) is defined to be a boundary pixel if any of its four connected neighboring pixels (left, top, right, and bottom) belongs to region 2 (or region 1). If a pixel is a boundary pixel, the motion compensation is performed using a weighted sum of the motion predictions of the two motion vectors of the two regions. The weight for the prediction using the motion vector of the region containing the boundary pixels is ¾ and the weight for the prediction using the motion vector of the other region is ¼. The overlapping boundaries improve the visual quality of the reconstructed video while also providing BD-rate gain.

p. Combined Inter and Intra Prediction (CIIP)

Combined inter/intra prediction (CIIP) combines an inter prediction signal with an intra prediction signal. The inter prediction signal in the CIIP mode P is $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging. Inter and intra prediction signals are combined using weighted averaging. The weight value is calculated depending on the coding modes of the top and left neighbouring blocks as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraLeft) is equal to 2, then wt is set to 3;

Otherwise, if (isIntraLeft+isIntraLeft) is equal to 1, then
wt is set to 2;
Otherwise, set wt to 1.
The CIIP prediction is formed as follows:

$$P_{CIIP}=((4-wt)*P_{inter}+wt*P_{intra}+2)>>2$$

In some embodiments, when a CU is coded in merge mode, if the CU contains at least 64 luma samples (that is, CU width times CU height is equal to or larger than 64), and if both CU width and CU height are less than 128 luma samples, an additional flag is signaled to indicate if the CIIP mode is applied to the current CU.

III. Merge Estimation Region (MER) and Merge Modes

Since IBC mode refers to the reference pixels on the current picture, parallel processing of IBC merge list generation is useless because the motion compensation of the current CU has to wait for the reconstruction of the previous CUs.

In some embodiments, MER mode is applicable for subblock merging list (including affine merge and SbTMVP) and non-subblock-non-IBC merge list (including GPM, MMVD merge, regular merge, CIIP merge), but not for IBC merge (and/or IBC AMVP). That is, for IBC merge (and/or IBC AMVP) mode, when generating the merge list, the video coder may refer to spatial neighbors that are inside the same MER region.

In some embodiments, MER mode is used in subblock merge and non-subblock-non-IBC merge (including GPM, MMVD merge, regular merge, CIIP merge), but disabled for IBC merge (and/or IBC AMVP). Specifically, when deriving the spatial neighbor of merge list for the current CU under a non-IBC mode, the spatial neighbor inside the MER region is excluded (set to unavailable) or be pushed to the boundary of the MER region. For some embodiments, the video coder determines whether to use the spatial neighbor as a merge candidate according to the following pseudo code:

```
Check_spatial_neighbor (input : is_ibc_or_not, ...)
{
    If (is_ibc_or_not == NON_IBC){
        If (neighbor is inside the same MER region as current
            CU)
            {treat as unavailable or pushed to MER
             boundary}
        Else {find the spatial neighbor MV }
    }
    Else
        {find the spatial neighbor MV }
}
If (mode == ibc merge || ibc amvp) is_ibc_or_not = IBC
Else is_ibc_or_not = NON_IBC
```

In other words, if IBC mode is used for coding the current CU, a spatial neighbor of the current CU can be used as a merge candidate regardless of whether the spatial neighbor is in a same MER as the current CU. Conversely, if IBC mode is not used, a spatial neighbor that is in the same MER as the current CU is excluded from the merge list as a merge candidate.

Figure 25:
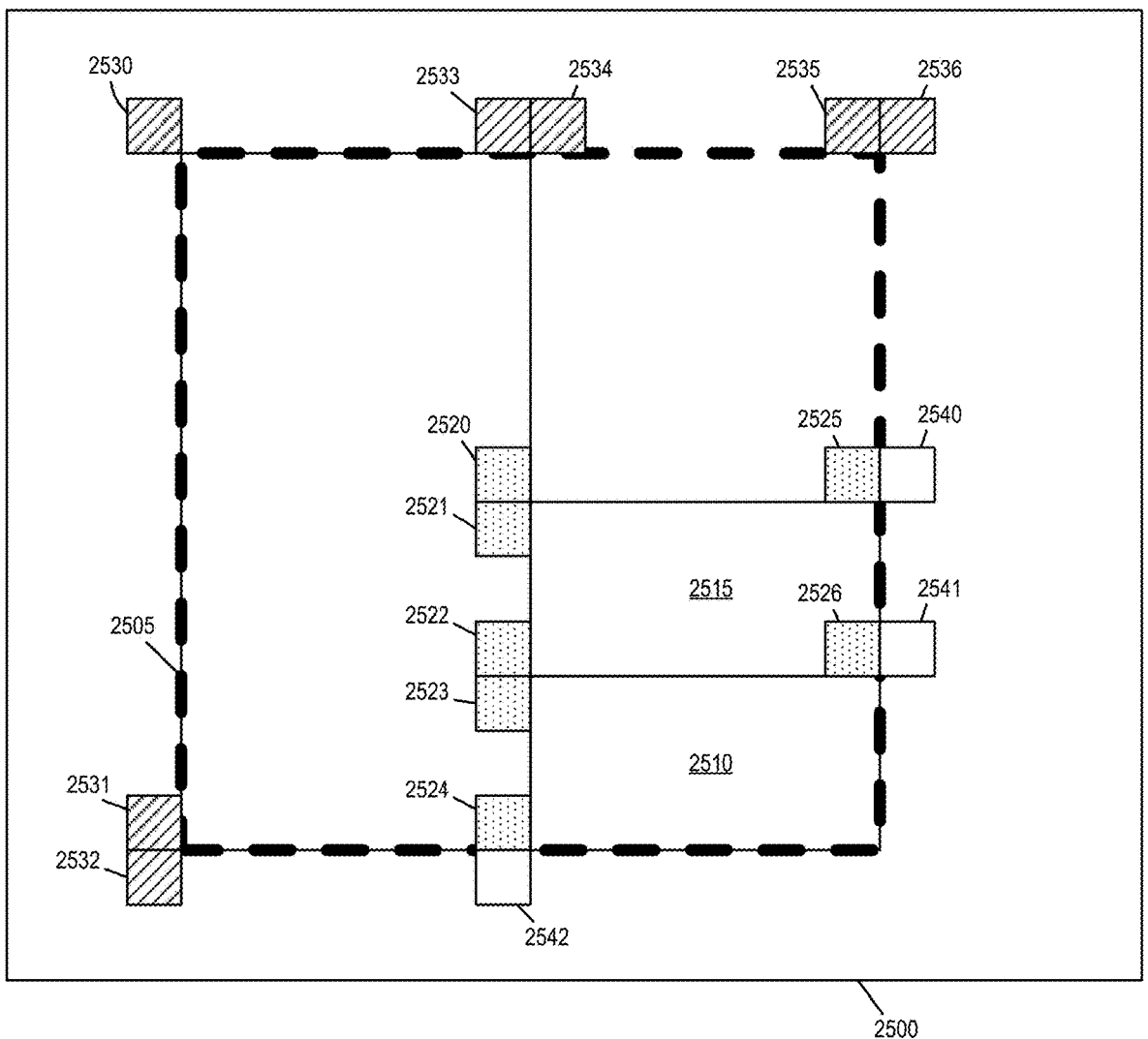
FIG. 25 conceptually illustrates inclusion and exclusion of spatial neighbors from merge candidate list based on MER and IBC modes.

FIG. 25 conceptually illustrates inclusion and exclusion of spatial neighbors from merge candidate list based on MER and IBC modes. As illustrated, a current picture 2500 has in it a defined MER 2505. The MER 2505 includes several CUs, including a CU 2510 and a CU 2515. The figure also illustrates several spatial neighbors, including spatial neighbors 2520-2526 that are inside the MER 2505, spatial neighbors 2530-2536 that are outside the MER 2505, and spatial neighbors 2540-2542 that are coded after the CUs in the MER 2505.

If IBC mode is off (or not applied) for CU 2510, spatial neighbors 2530-2536 outside the MER 2505 can be used as merge candidates for coding the CU 2510. Spatial neighbors 2540-2542 are within the MER 2505 and therefore excluded (or not available) as merge candidates for coding the CU 2510. On the other hand, if IBC mode is applied for CU 2515, spatial neighbors 2530-2536 and 2540-2542 can all be used (or available) as merge candidates regardless of the MER 2505 for coding the CU 2515.

The foregoing proposed method can be implemented in encoders and/or decoders. For example, the proposed method can be implemented in an inter prediction module of an encoder, and/or a inter prediction module of a decoder. In some embodiments, an encoder may signal (or generate) one or more syntax element in a bitstream, such that a decoder may parse said one or more syntax element from the bitstream.

IV. Example Video Encoder

Figure 26:
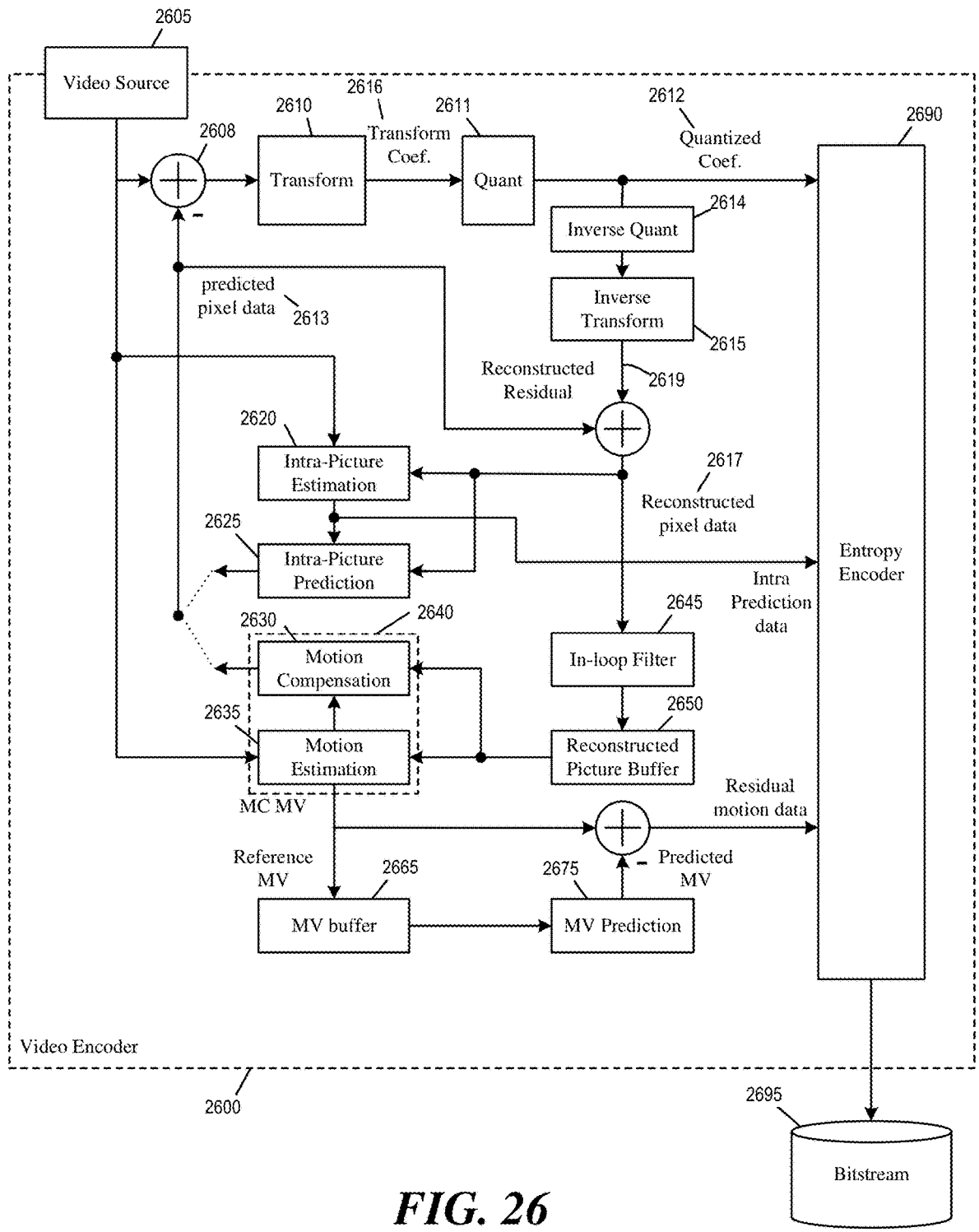
FIG. 26 illustrates an example video encoder that may use prediction candidate list to generate prediction when encoding pixel blocks.

FIG. 26 illustrates an example video encoder 2600 that may use prediction candidate list (for merge mode or AMVP) to generate prediction when encoding pixel blocks. As illustrated, the video encoder 2600 receives input video signal from a video source 2605 and encodes the signal into bitstream 2695. The video encoder 2600 has several components or modules for encoding the signal from the video source 2605, at least including some components selected from a transform module 2610, a quantization module 2611, an inverse quantization module 2614, an inverse transform module 2615, an intra-picture estimation module 2620, an intra-prediction module 2625, a motion compensation module 2630, a motion estimation module 2635, an in-loop filter 2645, a reconstructed picture buffer 2650, a MV buffer 2665, and a MV prediction module 2675, and an entropy encoder 2690. The motion compensation module 2630 and the motion estimation module 2635 are part of an inter-prediction module 2640.

In some embodiments, the modules 2610-2690 are modules of software instructions being executed by one or more processing units (e.g., a processor) of a computing device or electronic apparatus. In some embodiments, the modules 2610-2690 are modules of hardware circuits implemented by one or more integrated circuits (ICs) of an electronic apparatus. Though the modules 2610-2690 are illustrated as being separate modules, some of the modules can be combined into a single module.

The video source 2605 provides a raw video signal that presents pixel data of each video frame without compression. A subtractor 2608 computes the difference between the raw video pixel data of the video source 2605 and the predicted pixel data 2613 from the motion compensation module 2630 or intra-prediction module 2625. The transform module 2610 converts the difference (or the residual pixel data or residual signal 2609) into transform coefficients (e.g., by performing Discrete Cosine Transform, or DCT). The quantization module 2611 quantizes the transform coefficients into quantized data (or quantized coefficients) 2612, which is encoded into the bitstream 2695 by the entropy encoder 2690.

The inverse quantization module 2614 de-quantizes the quantized data (or quantized coefficients) 2612 to obtain transform coefficients, and the inverse transform module 2615 performs inverse transform on the transform coefficients to produce reconstructed residual 2619. The reconstructed residual 2619 is added with the predicted pixel data 2613 to produce reconstructed pixel data 2617. In some embodiments, the reconstructed pixel data 2617 is temporarily stored in a line buffer (not illustrated) for intra-picture prediction and spatial MV prediction. The reconstructed pixels are filtered by the in-loop filter 2645 and stored in the reconstructed picture buffer 2650. In some embodiments, the reconstructed picture buffer 2650 is a storage external to the video encoder 2600. In some embodiments, the reconstructed picture buffer 2650 is a storage internal to the video encoder 2600.

The intra-picture estimation module 2620 performs intra-prediction based on the reconstructed pixel data 2617 to produce intra prediction data. The intra-prediction data is provided to the entropy encoder 2690 to be encoded into bitstream 2695. The intra-prediction data is also used by the intra-prediction module 2625 to produce the predicted pixel data 2613.

The motion estimation module 2635 performs inter-prediction by producing MVs to reference pixel data of previously decoded frames stored in the reconstructed picture buffer 2650. These MVs are provided to the motion compensation module 2630 to produce predicted pixel data.

Instead of encoding the complete actual MVs in the bitstream, the video encoder 2600 uses MV prediction to generate predicted MVs, and the difference between the MVs used for motion compensation and the predicted MVs is encoded as residual motion data and stored in the bitstream 2695.

The MV prediction module 2675 generates the predicted MVs based on reference MVs that were generated for encoding previously video frames, i.e., the motion compensation MVs that were used to perform motion compensation. The MV prediction module 2675 retrieves reference MVs from previous video frames from the MV buffer 2665. The video encoder 2600 stores the MVs generated for the current video frame in the MV buffer 2665 as reference MVs for generating predicted MVs.

The MV prediction module 2675 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 2695 by the entropy encoder 2690.

The entropy encoder 2690 encodes various parameters and data into the bitstream 2695 by using entropy-coding techniques such as context-adaptive binary arithmetic coding (CABAC) or Huffman encoding. The entropy encoder 2690 encodes various header elements, flags, along with the quantized transform coefficients 2612, and the residual motion data as syntax elements into the bitstream 2695. The bitstream 2695 is in turn stored in a storage device or transmitted to a decoder over a communications medium such as a network.

The in-loop filter 2645 performs filtering or smoothing operations on the reconstructed pixel data 2617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 27:
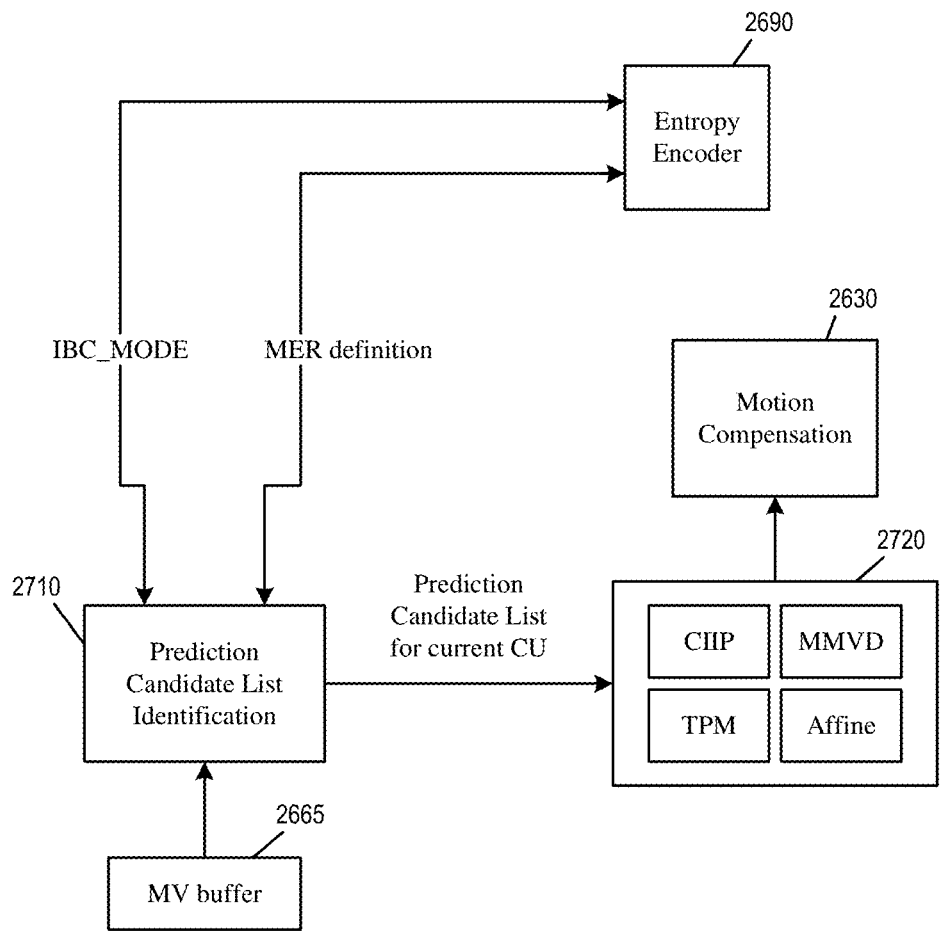
FIG. 27 illustrates portions of the video encoder that identify prediction candidates based on MER and IBC modes.

FIG. 27 illustrates portions of the video encoder 2600 that identify prediction candidates based on MER and IBC modes. Specifically, the figure illustrates the components of the inter-prediction module 2640 of the video encoder 2600. As illustrated, a prediction candidate list identification module 2710 determines which motion vectors from the MV buffer 2665 to include in a prediction candidate list (for merge mode or for AMVP) for a current CU. The video encoder provides signals for indicating whether IBC mode is used for the current CU and for defining a MER. The signals for IBC mode indication and MER definition are provided to the entropy encoder 2690 to be included in the bitstream as syntax elements.

The prediction candidate list identification module 2710 uses the IBC mode and MER definition to decide whether include or exclude certain motion vectors. For example, when MER is active and IBC is inactive for the current CU, the prediction candidate list identification module 2710 may exclude motion vectors from spatial neighbors of the current CU that are in the same MER as the current CU; and if IBC mode is active for the current CU, the prediction candidate list identification module 2710 may include motion vectors from spatial neighbors of the current CU that are in the same MER as the current CU, i.e., spatial neighbors of the current CU may be included regardless of MER definitions.

The prediction candidate list that is identified for the current CU by the prediction candidate list identification module 2710 is in turn provided to a prediction generation module 2720, which generates a prediction of the current CU according to one of the possible prediction modes (CIIP, MMVD, GPM, affine, etc.) for the motion compensation module 2630.

Figure 28:
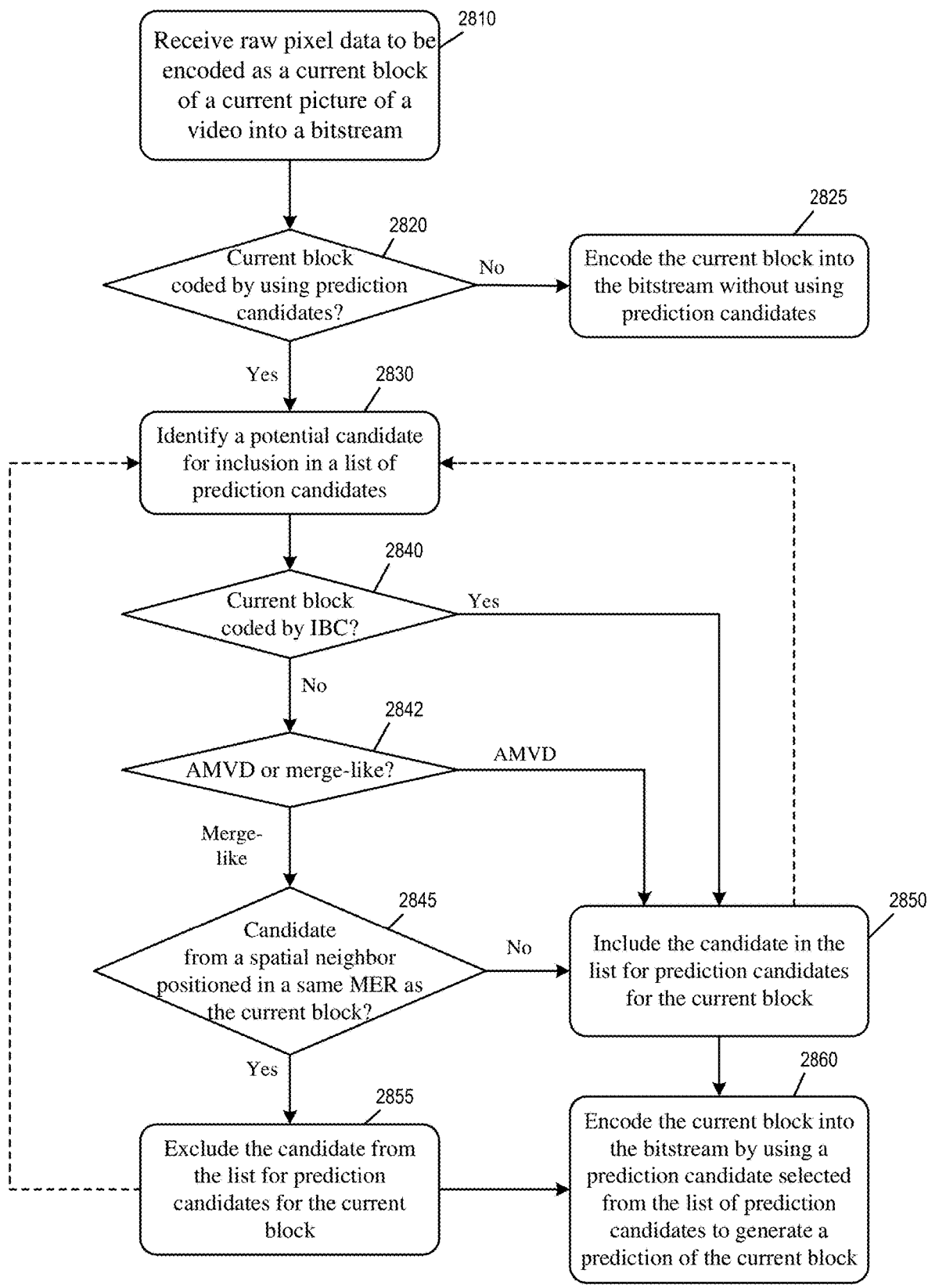
FIG. 28 conceptually illustrates a process for using prediction candidates that are identified based on MER and IBC modes to encode pixel blocks in a video picture.

FIG. 28 conceptually illustrates a process 2800 for using prediction candidates that are identified based on MER and IBC modes to encode pixel blocks in a video picture. In some embodiments, one or more processing units (e.g., a processor) of a computing device implements the encoder 2600 performs the process 2800 by executing instructions stored in a computer readable medium. In some embodiments, an electronic apparatus implementing the encoder 2600 performs the process 2800.

The encoder receives (at block 2810) raw data to be encoded as a current block of a current picture of a video into a bitstream. The encoder determines (at block 2820) whether the current block is coded by using prediction candidates (e.g., a list of merge mode candidates or a list of AMVP candidates). In some embodiments, the encoder signals syntax elements into the bitstream that indicate whether the current block is coded by using prediction candidates. If the current block is coded by using prediction candidates, the process proceeds to 2830. Otherwise, the encoder encodes (at block 2825) the current block without using prediction candidates.

At block 2830, the encoder identifies a potential candidate for inclusion in a list of prediction candidates for the current block. The encoder determines (at block 2840) whether the current block is coded by intra block copy mode and (at block 2842) whether the list of prediction candidates belongs to or is derived from a predefined subset of different candidate lists. In some embodiments, the predefined subset of different candidate lists includes merge mode or merge-like candidates (e.g., CIIP, GPM, regular merge) and exclude AMVP candidates. If the current block is coded by intra block copy mode or if the list of prediction candidates is a list for AMVP, the process proceeds to 2850. Otherwise (the current block is not coded by IBC and the list of prediction candidates is merge or merge-like), the process proceeds to 2845.

When the current block is coded by using intra block copy mode, a motion vector that refers to already-encoded reference samples in the current picture is used to generate a prediction of the current block. When the current block is not coded by using intra block copy mode, the current block and at least one other block in the MER may be encoded in parallel. In some embodiments, the encoder signals one or more syntax elements in the bitstream to indicate whether intra block copy mode is used for the current block.

The encoder determines (at block 2845) whether the candidate is from a spatial neighbor positioned in a same MER as the current block. In some embodiments, one or more syntax elements in the bitstream can be used to identify or define a MER that includes the current block. If the spatial neighbor is in a same MER as the current block, the process proceeds to block 2855. Otherwise the process proceeds to 2850.

At block 2850, the encoder includes the candidate in the list of prediction candidates for the current block. The process may return to block 2830 if there are additional potential candidates for inclusion in the prediction candidate list. If there are no other potential candidates, the process proceeds to 2860.

At block 2855, the encoder excludes the candidate from the list of prediction candidates for the current block. In some embodiments, when the current block is not coded by using intra block copy mode, all spatial neighbors of the current block that are positioned in the MER are excluded from the list of prediction candidates. The process may return to block 2830 if there are additional potential candidates for inclusion in the prediction candidate list. If there are no other potential candidates, the process proceeds to 2860.

The encoder encodes (at block 2860) the current block into the bitstream by using a prediction candidate selected from the list of prediction candidates to generate a prediction of the current block. The prediction of the current block may be an affine prediction that is generated based on the selected prediction candidate. The prediction of the current block may be a triangular or GPM prediction that is generated based on the selected prediction candidate. The prediction of the current block may be a combined inter and intra prediction (CIIP) that is generated based on the selected prediction candidate. The prediction of the current block may be generated by refining the selected prediction candidate with a motion vector difference information.

V. Example Video Decoder

Figure 29:
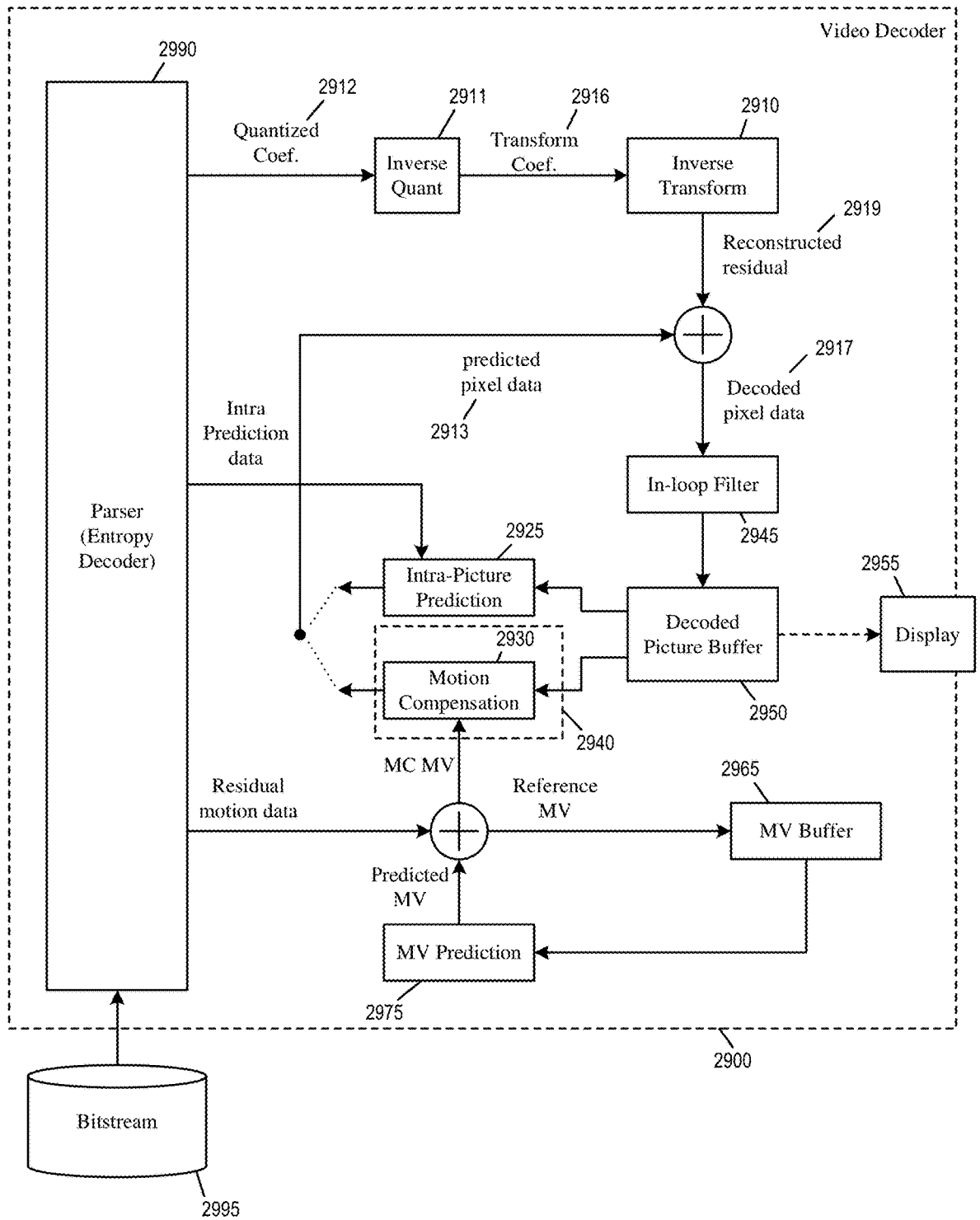
FIG. 29 illustrates an example video decoder that may use prediction candidate list to generate prediction when decoding pixel blocks.

FIG. 29 illustrates an example video decoder 2900 that may use prediction candidate list (for merge mode or AMVP) to generate prediction when decoding pixel blocks. As illustrated, the video decoder 2900 is an image-decoding or video-decoding circuit that receives a bitstream 2995 and decodes the content of the bitstream into pixel data of video frames for display. The video decoder 2900 has several components or modules for decoding the bitstream 2995, including some components selected from an inverse quantization module 2911, an inverse transform module 2910, an intra-prediction module 2925, a motion compensation module 2930, an in-loop filter 2945, a decoded picture buffer 2950, a MV buffer 2965, a MV prediction module 2975, and a parser 2990. The motion compensation module 2930 is part of an inter-prediction module 2940.

In some embodiments, the modules 2910-2990 are modules of software instructions being executed by one or more processing units (e.g., a processor) of a computing device. In some embodiments, the modules 2910-2990 are modules of hardware circuits implemented by one or more ICs of an electronic apparatus. Though the modules 2910-2990 are illustrated as being separate modules, some of the modules can be combined into a single module.

The parser 2990 (or entropy decoder) receives the bitstream 2995 and performs initial parsing according to the syntax defined by a video-coding or image-coding standard. The parsed syntax element includes various header elements, flags, as well as quantized data (or quantized coefficients) 2912. The parser 2990 parses out the various syntax elements by using entropy-coding techniques such as context-adaptive binary arithmetic coding (CABAC) or Huffman encoding.

The inverse quantization module 2911 de-quantizes the quantized data (or quantized coefficients) 2912 to obtain transform coefficients, and the inverse transform module 2910 performs inverse transform on the transform coefficients 2916 to produce reconstructed residual signal 2919. The reconstructed residual signal 2919 is added with predicted pixel data 2913 from the intra-prediction module 2925 or the motion compensation module 2930 to produce decoded pixel data 2917. The decoded pixels data are filtered by the in-loop filter 2945 and stored in the decoded picture buffer 2950. In some embodiments, the decoded picture buffer 2950 is a storage external to the video decoder 2900. In some embodiments, the decoded picture buffer 2950 is a storage internal to the video decoder 2900.

The intra-prediction module 2925 receives intra-prediction data from bitstream 2995 and according to which, produces the predicted pixel data 2913 from the decoded pixel data 2917 stored in the decoded picture buffer 2950. In some embodiments, the decoded pixel data 2917 is also stored in a line buffer (not illustrated) for intra-picture prediction and spatial MV prediction.

In some embodiments, the content of the decoded picture buffer 2950 is used for display. A display device 2955 either retrieves the content of the decoded picture buffer 2950 for display directly, or retrieves the content of the decoded picture buffer to a display buffer. In some embodiments, the display device receives pixel values from the decoded picture buffer 2950 through a pixel transport.

The motion compensation module 2930 produces predicted pixel data 2913 from the decoded pixel data 2917 stored in the decoded picture buffer 2950 according to motion compensation MVs (MC MVs). These motion compensation MVs are decoded by adding the residual motion data received from the bitstream 2995 with predicted MVs received from the MV prediction module 2975.

The MV prediction module 2975 generates the predicted MVs based on reference MVs that were generated for decoding previous video frames, e.g., the motion compensation MVs that were used to perform motion compensation. The MV prediction module 2975 retrieves the reference MVs of previous video frames from the MV buffer 2965. The video decoder 2900 stores the motion compensation MVs generated for decoding the current video frame in the MV buffer 2965 as reference MVs for producing predicted MVs.

The in-loop filter 2945 performs filtering or smoothing operations on the decoded pixel data 2917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 30:
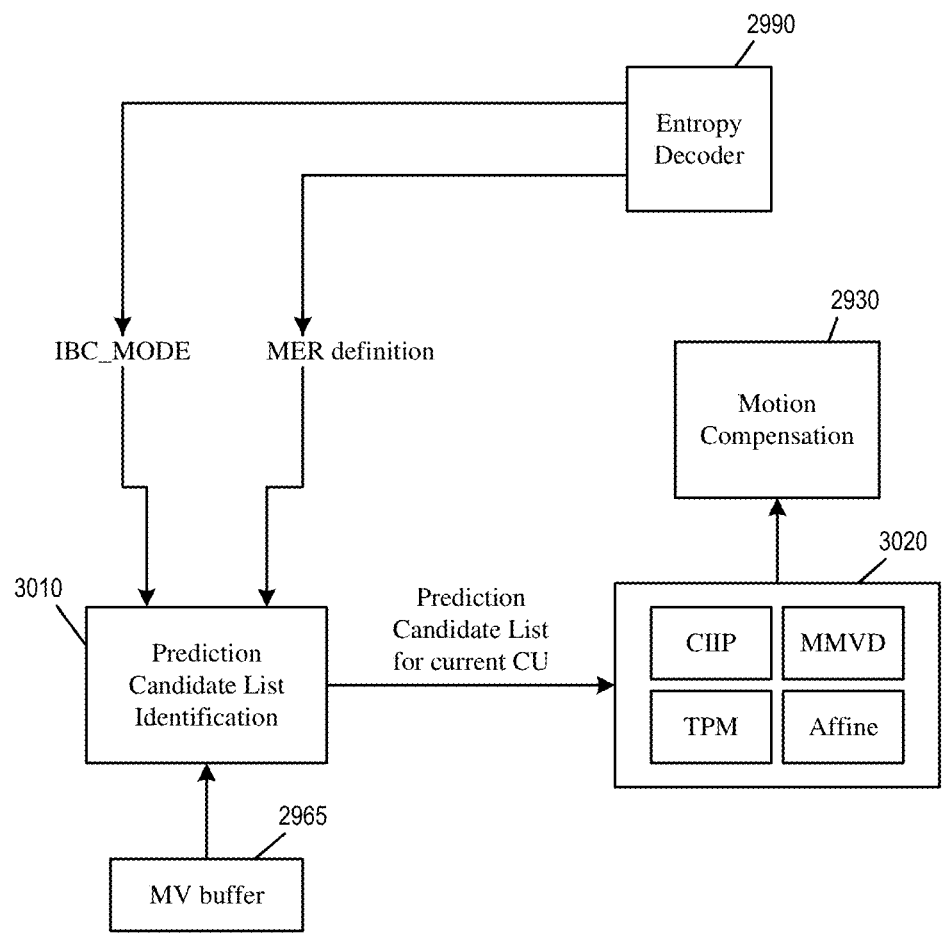
FIG. 30 illustrates portions of the video decoder that identify prediction candidates based on MER and IBC modes.

FIG. 30 illustrates portions of the video decoder 2900 that identify prediction candidates based on MER and IBC modes. Specifically, the figure illustrates the components of the inter-prediction module 2940 of the video decoder 2900. A prediction candidate list identification module 3010 determines which motion vectors from the MV buffer 2965 to include in a prediction candidate list as a prediction candidate for a current CU.

As illustrated, the entropy decoder 2990 parses the bitstream for syntax elements that signal whether IBC mode is used for the current CU and for syntax elements that defines a MER. The prediction candidate list identification module 3010 uses the IBC mode indication and the MER definition to decide whether include or exclude certain motion vectors. For example, when MER is active and IBC is inactive for the current CU, the prediction candidate list identification module 3010 may exclude motion vectors from spatial neighbors of the current CU that are in the same MER as the current CU; and if IBC mode is active for the current CU, the prediction candidate list identification module 3010 may include motion vectors from spatial neighbors of the current CU that are in the same MER as the current CU, i.e., spatial neighbors of the current CU may be included regardless of MER definitions.

The prediction candidate list that is identified for the current CU by the prediction candidate list identification module 2710 is in turn provided to a prediction generation module 3020, which generates a prediction of the current CU according to one of the possible prediction modes (CIIP, MMVD, GPM, affine, etc.) for the motion compensation module 2930.

Figure 31:
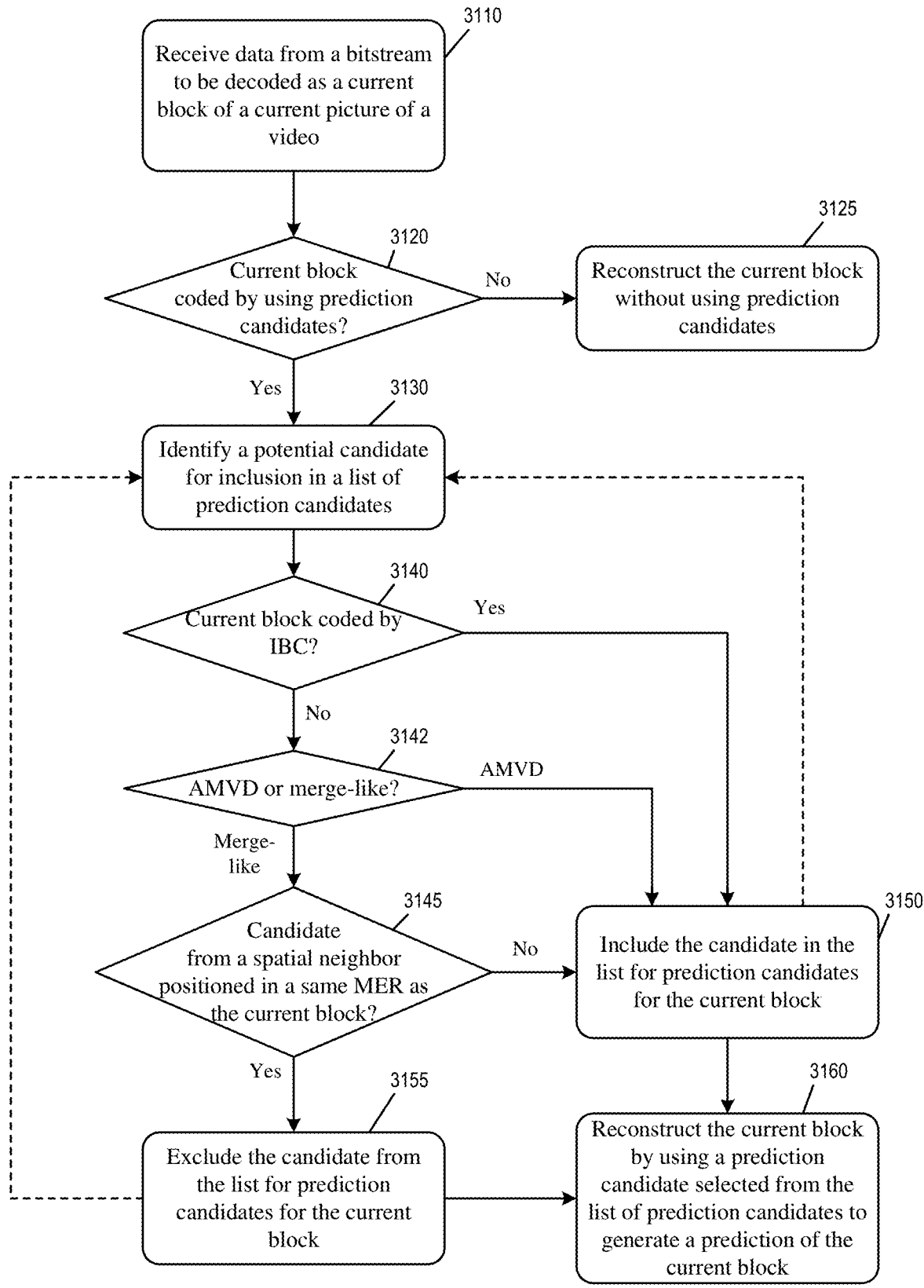
FIG. 31 conceptually illustrates a process for using prediction candidates that are identified based on MER and IBC modes to decode pixel blocks in a video picture.

FIG. 31 conceptually illustrates a process 3100 for using prediction candidates that are identified based on MER and IBC modes to decode pixel blocks in a video picture. In some embodiments, one or more processing units (e.g., a processor) of a computing device implements the decoder 2900 performs the process 3100 by executing instructions stored in a computer readable medium. In some embodiments, an electronic apparatus implementing the decoder 2900 performs the process 3100.

The decoder receives (at block 3110) data from a bitstream to be decoded as a current block of a current picture. The decoder determines (at block 3120) whether the current block is coded by using prediction candidates (e.g., a list of merge mode candidates or a list of AMVP candidates). In some embodiments, the decoder parses syntax elements from the bitstream that indicate whether the current block is coded by using prediction candidates. If the current block is coded by using prediction candidates, the process proceeds to 2830. Otherwise, the decoder reconstructs (at block 3125) the current block without using prediction candidates.

At block 3130, the decoder identifies a potential candidate for inclusion in a list of prediction candidates for the current block. The decoder determines (at block 3140) whether the current block is coded by intra block copy mode and (at block 3142) whether the list of prediction candidates belongs to or is derived from a predefined subset of different candidate lists. In some embodiments, the predefined subset of different candidate lists includes merge mode or merge-like candidates (e.g., CIIP, GPM, regular merge) and exclude AMVP candidates. If the current block is coded by intra block copy mode or if the list of prediction candidates is a list for AMVP, the process proceeds to 2850. Otherwise (the current block is not coded by IBC and the list of prediction candidates is merge or merge-like), the process proceeds to 3145.

When the current block is coded by using intra block copy mode, a motion vector that refers to already-decoded reference samples in the current picture is used to generate a prediction of the current block. When the current block is not coded by using intra block copy mode, the current block and at least one other block in the MER may be decoded in parallel. In some embodiments, the decoder receives one or more syntax elements in the bitstream to indicate whether intra block copy mode is used for the current block.

The decoder determines (at block 3145) whether the candidate is from a spatial neighbor positioned in a same MER as the current block. In some embodiments, one or more syntax elements in the bitstream can be used to identify or define a MER that include the current block. If the spatial neighbor is in a same MER as the current block, the process proceeds to block 3155. Otherwise the process proceeds to 3150.

At block 3150, the decoder includes the candidate in the list of prediction candidates for the current block. The process may return to block 3130 if there are additional potential candidates for inclusion in the prediction candidate list. If there are no other potential candidates, the process proceeds to 3160.

At block 3155, the decoder excludes the candidate from the list of prediction candidates for the current block. In some embodiments, when the current block is not coded by using intra block copy mode, all spatial neighbors of the current block that are positioned in the MER are excluded from the list of prediction mode candidates. The process may return to block 3130 if there are additional potential candidates for inclusion in the prediction candidate list. If there are no other potential candidates, the process proceeds to 3160.

The decoder reconstructs (at block 3160) the current block by using a merge candidate selected from the list of prediction candidates to generate a prediction of the current block. The prediction of the current block may be an affine prediction that is generated based on the selected prediction candidate. The prediction of the current block may be a triangular or GPM prediction that is generated based on the selected prediction candidate. The prediction of the current block may be a combined inter and intra prediction (CIIP) that is generated based on the selected prediction candidate. The prediction of the current block may be generated by refining the selected prediction candidate with a motion vector difference information.

VI. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 32:
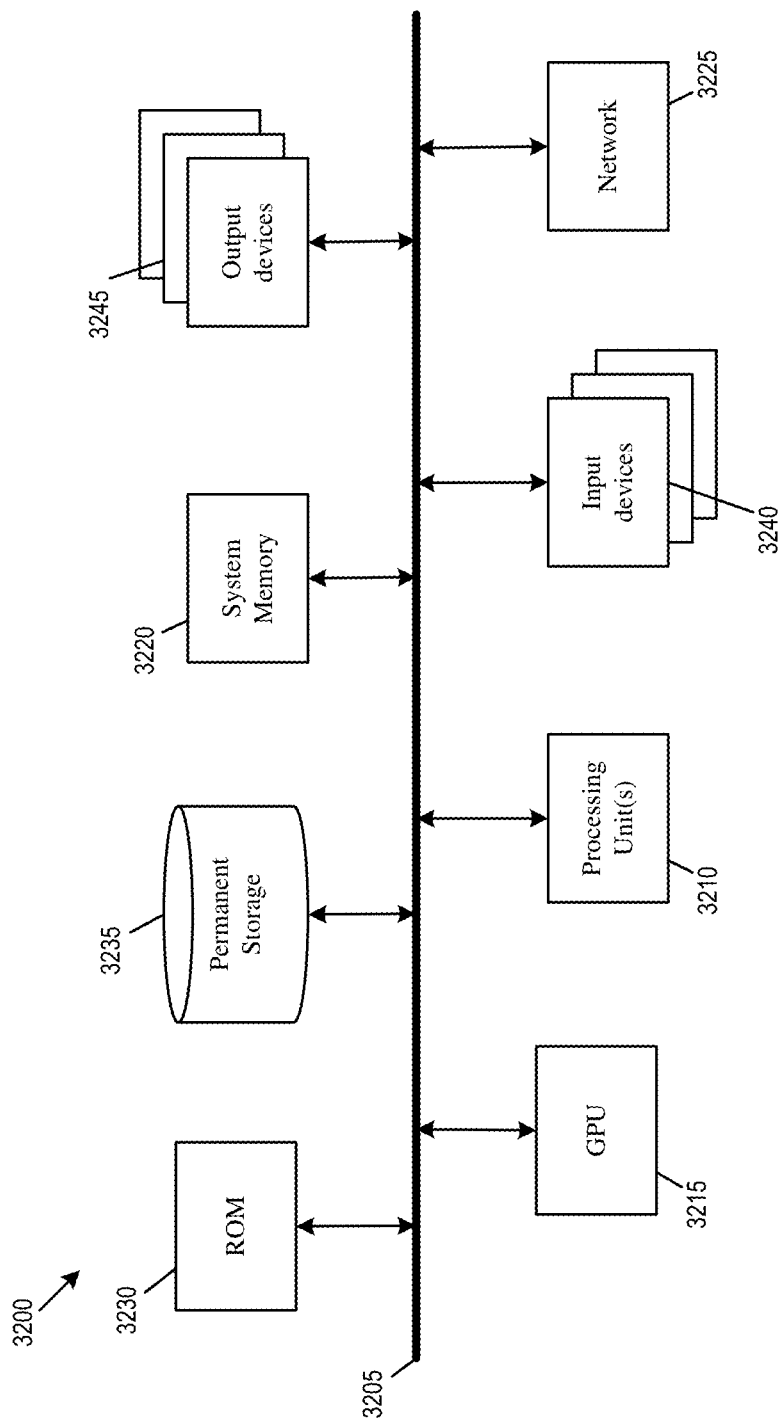
FIG. 32 conceptually illustrates an electronic system with which some embodiments of the present disclosure are implemented.

FIG. 32 conceptually illustrates an electronic system 3200 with which some embodiments of the present disclosure are implemented. The electronic system 3200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 3200 includes a bus 3205, processing unit(s) 3210, a graphics-processing unit (GPU) 3215, a system memory 3220, a network 3225, a read-only memory 3230, a permanent storage device 3235, input devices 3240, and output devices 3245.

The bus 3205 collectively represents all system, peripheral, and chipset buses that communicatively connect the numerous internal devices of the electronic system 3200. For instance, the bus 3205 communicatively connects the processing unit(s) 3210 with the GPU 3215, the read-only memory 3230, the system memory 3220, and the permanent storage device 3235.

From these various memory units, the processing unit(s) 3210 retrieves instructions to execute and data to process in order to execute the processes of the present disclosure. The processing unit(s) may be a single processor or a multi-core processor in different embodiments. Some instructions are passed to and executed by the GPU 3215. The GPU 3215 can offload various computations or complement the image processing provided by the processing unit(s) 3210.

The read-only-memory (ROM) 3230 stores static data and instructions that are used by the processing unit(s) 3210 and other modules of the electronic system. The permanent storage device 3235, on the other hand, is a read-and-write memory device. This device is a non-volatile memory unit that stores instructions and data even when the electronic system 3200 is off. Some embodiments of the present disclosure use a mass-storage device (such as a magnetic or optical disk and its corresponding disk drive) as the permanent storage device 3235.

Other embodiments use a removable storage device (such as a floppy disk, flash memory device, etc., and its corresponding disk drive) as the permanent storage device. Like the permanent storage device 3235, the system memory 3220 is a read-and-write memory device. However, unlike storage device 3235, the system memory 3220 is a volatile read-and-write memory, such a random access memory. The system memory 3220 stores some of the instructions and data that the processor uses at runtime. In some embodiments, processes in accordance with the present disclosure are stored in the system memory 3220, the permanent storage device 3235, and/or the read-only memory 3230. For example, the various memory units include instructions for processing multimedia clips in accordance with some embodiments. From these various memory units, the processing unit(s) 3210 retrieves instructions to execute and data to process in order to execute the processes of some embodiments.

The bus 3205 also connects to the input and output devices 3240 and 3245. The input devices 3240 enable the user to communicate information and select commands to the electronic system. The input devices 3240 include alpha-numeric keyboards and pointing devices (also called "cursor control devices"), cameras (e.g., webcams), microphones or similar devices for receiving voice commands, etc. The output devices 3245 display images generated by the electronic system or otherwise output data. The output devices 3245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 32, bus 3205 also couples electronic system 3200 to a network 3225 through a network adapter (not shown). In this manner, the computer can be a part of a network of computers (such as a local area network ("LAN"), a wide area network ("WAN"), or an Intranet, or a network of networks, such as the Internet. Any or all components of electronic system 3200 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 28 and FIG. 31) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
receiving data from a bitstream to be decoded as a current block of a current picture of a video, the bitstream indicating that a merge estimate region (MER) for the current block is defined, and the MER for the current block encompassing the current block and a region neighboring the current block;
determining whether the current block is coded by using intra block copy mode;
identifying a list of one or more prediction candidates for the current block,
wherein when the current block is not coded by using the intra block copy mode and the list of one or more prediction candidates belongs to a predefined subset of a plurality of different candidate lists, one or more spatial neighbors of the current block that are positioned in the MER for the current block are excluded from being used to derive the list of one or more prediction candidates, and
wherein when the current block is coded by using the intra block copy mode, at least one prediction candidate in the list of one or more prediction candidates is derived from a spatial neighbor of the current block that is positioned in the MER for the current block; and reconstructing the current block by using a prediction candidate selected from the list of one or more prediction candidates to generate a prediction of the current block.

2. The video decoding method of claim 1, wherein when the current block is not coded by using the intra block copy mode, the current block and at least one other block in the MER are reconstructed in parallel.

3. The video decoding method of claim 1, wherein when the current block is coded by using the intra block copy mode, a motion vector that refers to already-reconstructed reference samples in the current picture is used to generate a prediction of the current block.

4. The video decoding method of claim 1, wherein one or more syntax elements in the bitstream indicates whether the intra block copy mode is used for coding the current block.

5. The video decoding method of claim 1, further comprising parsing one or more syntax elements in the bitstream and determining whether the intra block copy mode is used for the current block based on the parsed one or more syntax elements.

6. The video decoding method of claim 1, wherein when the current block is not coded by using the intra block copy mode, all spatial neighbors of the current block that are positioned in the MER are excluded from being used to derive the list of one or more prediction candidates.

7. The video decoding method of claim 1, wherein the prediction of the current block is an affine prediction that is generated based on the selected prediction candidate.

8. The video decoding method of claim 1, wherein the prediction of the current block is a geometric partition mode (GPM) prediction that is generated based on the selected prediction candidate.

9. The video decoding method of claim 1, wherein the prediction of the current block is a combined inter and intra prediction (CIIP) that is generated based on the selected prediction candidate.

10. The video decoding method of claim 1, wherein the prediction of the current block is generated by refining the selected prediction candidate with a motion vector difference information.

11. The video decoding method of claim 1, wherein the prediction of the current block is improved by using motion field in a collocated picture at a subblock level.

12. The video decoding method of claim 1, wherein the predefined subset of the plurality of different candidate lists includes candidates of merge-like prediction modes.

13. The video decoding method of claim 1, wherein the predefined subset of the plurality of different candidate lists excludes candidates of advanced motion vector prediction (AMVP).

14. A video encoding method, comprising:
receiving raw pixel data to be encoded as a current block of a current picture of a video into a bitstream, the bitstream indicating that a merge estimate region (MER) for the current block is defined, and the MER for the current block encompassing the current block and a region neighboring the current block;
determining whether the current block is coded by using intra block copy mode;
identifying a list of one or more prediction candidates for the current block,
wherein when the current block is not coded by using the intra block copy mode and the list of one or more prediction candidates belongs to a predefined subset of a plurality of different candidate lists, one or more spatial neighbors of the current block that are positioned in the MER for the current block are excluded from being used to derive the list of one or more prediction candidates, and
wherein when the current block is coded by using the intra block copy mode, at least one prediction candidate in the list of one or more prediction candidates is derived from a spatial neighbor of the current block that is positioned in the MER for the current block; and
encoding the current block by using a prediction candidate selected from the list of one or more prediction candidates to generate a prediction of the current block.

15. The video encoding method of claim 14, further comprising signaling one or more syntax elements in the bitstream to indicate whether the intra block copy mode is used for the current block.

16. An electronic apparatus, comprising:
a video decoder circuit configured to perform operations comprising:
receiving data from a bitstream to be decoded as a current block of a current picture of a video, the bitstream indicating that a merge estimate region (MER) for the current block is defined, and the MER for the current block encompassing the current block and a region neighboring the current block;
determining whether the current block is coded by using intra block copy mode;
identifying a list of one or more prediction candidates for the current block,
wherein when the current block is not coded by using the intra block copy mode and the list of one or more prediction candidates is derived from a predefined subset of a plurality of different candidate lists, one or more spatial neighbors of the current block that are positioned in the MER for the current block are excluded from being used to derive the list of one or more prediction candidates, and
wherein when the current block is coded by using the intra block copy mode, at least one prediction candidate in the list of one or more prediction candidates is derived from a spatial neighbor of the current block that is positioned in the MER for the current block; and
reconstructing the current block by using a prediction candidate selected from the list of one or more prediction candidates to generate a prediction of the current block.

* * * * *